United States Patent [19]
Sakakibara et al.

[11] Patent Number: 5,809,539
[45] Date of Patent: Sep. 15, 1998

[54] PROCESSOR SYSTEM HAVING ADDRESS ALLOCATION AND ADDRESS LOCK CAPABILITY ADAPTED FOR A MEMORY COMPRISED OF SYNCHRONOUS DRAMS

[75] Inventors: Tadayuki Sakakibara; Teruo Tanaka, both of Hadano; Yoshiko Tamaki, Kodaira, all of Japan

[73] Assignee: Hitachi, Ltd., Tokyo, Japan

[21] Appl. No.: 637,283

[22] Filed: Apr. 24, 1996

[30] Foreign Application Priority Data

Apr. 27, 1995 [JP] Japan .................................. 7-127129

[51] Int. Cl.$^6$ .................................................. G06F 12/00
[52] U.S. Cl. .......................... 711/151; 711/127; 711/157; 711/158
[58] Field of Search ..................................... 395/800, 485, 395/405, 457, 182.04; 365/203, 230.03; 711/151, 114, 127, 158, 5, 130

[56] References Cited

U.S. PATENT DOCUMENTS

| | | | |
|---|---|---|---|
| 4,803,621 | 2/1989 | Kelly ........................................ | 395/405 |
| 4,937,791 | 6/1990 | Steele et al. ........................ | 365/230.03 |
| 5,140,682 | 8/1992 | Okura et al. ............................ | 395/457 |
| 5,269,010 | 12/1993 | MacDonald ............................ | 395/405 |
| 5,392,443 | 2/1995 | Sakakibara et al. .................... | 395/800 |
| 5,440,713 | 8/1995 | Lin et al. ................................. | 395/485 |
| 5,631,871 | 5/1997 | Park et al. ............................... | 365/203 |
| 5,638,534 | 6/1997 | Mote, Jr. ................................. | 395/485 |

FOREIGN PATENT DOCUMENTS 5-165716  7/1993  Japan .

OTHER PUBLICATIONS

"Transistor Technology" Oct. 1993 pp. 324–331.
"Performance of Cached DRAM Organizations in Vector Supercomputers" Proc. of the 20th Annual Intl. Symposium on Computer Arch. pp. 327–336 (1993).

*Primary Examiner*—Tod R. Swann
*Assistant Examiner*—Fred F. Tzeng
*Attorney, Agent, or Firm*—Antonelli, Terry, Stout & Kraus, LLP

[57] ABSTRACT

In order to make use of row address lock mode of operation of a plurality of memory banks comprising synchronous DRAMs or the like and divided into a plurality of real bank groups, for example, for example, more than the memory banks are grouped into a plurality of logical groups each spanning the real bank groups. Addresses are allocated in unit of each logical group in a block-interleaving manner. When a series of requests issued by a given requester include a plurality of requests for accessing the same row address in the same memory bank, that requester requests that the row address be locked for access by the plurality of requests. The lock request is retained by a row address management unit. When a succeeding request from another requester requests access to a row address other than the locked address in the same memory bank, a priority circuit selects a predetermined number of requests from the initial requester having locked the memory in preference to a request made by the other requester.

15 Claims, 15 Drawing Sheets

FIG. 2

| RA | CA | RBG# | 0 | | | | 1 | | | | 2 | | | | 3 | | | |
|---|---|---|---|---|---|---|---|---|---|---|---|---|---|---|---|---|---|---|
| | | BKa# | 0 | 1 | 2 | 3 | 0 | 1 | 2 | 3 | 0 | 1 | 2 | 3 | 0 | 1 | 2 | 3 |
| | | BK# | 0 | 1 | 2 | 3 | 4 | 5 | 6 | 7 | 8 | 9 | 10 | 11 | 12 | 13 | 14 | 15 |
| | | LBG# | 0 | 1 | 2 | 3 | 0 | 1 | 2 | 3 | 0 | 1 | 2 | 3 | 0 | 1 | 2 | 3 |
| 0 | 0 | ADDRESS | 0 | 64 | 128 | 192 | 1 | 65 | 129 | 193 | 2 | 66 | 130 | 194 | 3 | 67 | 131 | 195 |
| | 1 | | 4 | 68 | 132 | 196 | 5 | 69 | 133 | 197 | 6 | 70 | 134 | 198 | 7 | 71 | 135 | 199 |
| | 2 | | 8 | 72 | 136 | 200 | 9 | 73 | 137 | 201 | 10 | 74 | 138 | 202 | 11 | 75 | 139 | 203 |
| | ... | | ... | ... | ... | ... | ... | ... | ... | ... | ... | ... | ... | ... | ... | ... | ... | ... |
| | 15 | | 60 | 124 | 188 | 252 | 61 | 125 | 189 | 253 | 62 | 126 | 190 | 254 | 63 | 127 | 191 | 255 |
| | 16 | | 256 | 320 | 384 | 446 | 257 | 321 | 385 | 447 | 258 | 322 | 386 | 448 | 259 | 323 | 387 | 449 |
| | 17 | | 260 | ... | ... | ... | ... | ... | ... | ... | ... | ... | ... | ... | ... | ... | ... | ... |
| | ... | | ... | | | | | | | | | | | | | | | |
| | 511 | | 2048 | | | | | | | | | | | | | | | |
| 1 | 0 | | | | | | | | | | | | | | | | | |

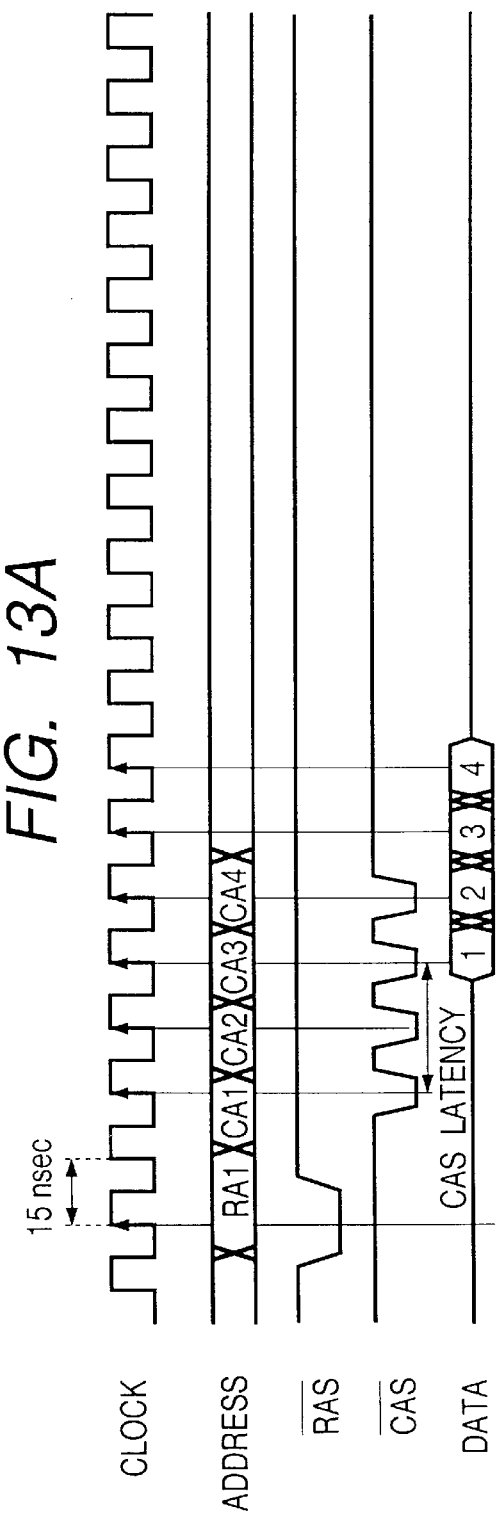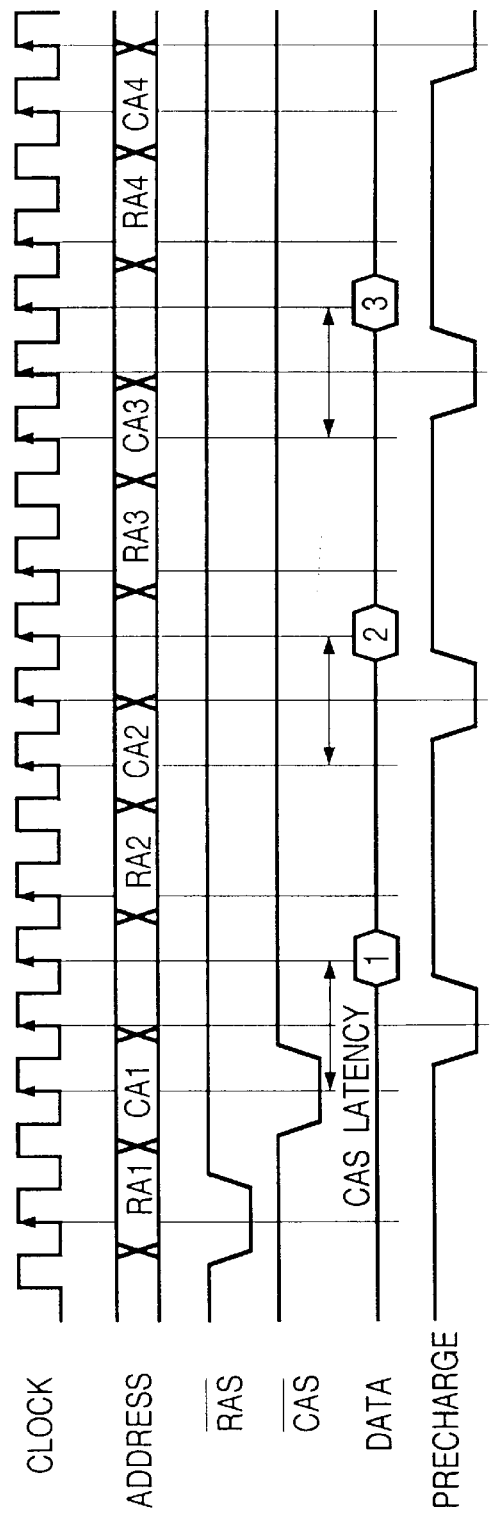

FIG. 14
PRIOR ART

| BK# | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ADDRESS | 0 | 1 | 2 | 3 | 4 | 5 | 6 | 7 | 8 | 9 | 10 | 11 | 12 | 13 | 14 | 15 |
|  | 16 | 17 | 18 | 19 | 20 | 21 | 22 | 23 | 24 | 25 | 26 | 27 | 28 | 29 | 30 | 31 |
|  | 32 | 33 | 34 | 35 | 36 | 37 | 38 | 39 | 40 | 41 | 42 | 43 | 44 | 45 | 46 | 47 |
|  | 48 | 49 | 50 | 51 | 52 | 53 | 54 | 55 | 56 | 57 | 58 | 59 | 60 | 61 | 62 | 63 |
|  | 64 | 65 | 66 | 67 | 68 | 69 | 70 | 71 | 72 | 73 | 74 | 75 | 76 | 77 | 78 | 79 |
|  | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ |

FIG. 15
PRIOR ART

| BK# | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| ADDRESS | 0 | 1 | 2 | 3 | 16 | 17 | 18 | 19 | 32 | 33 | 34 | 35 | 48 | 49 | 50 | 51 |
|  | 4 | 5 | 6 | 7 | 20 | 21 | 22 | 23 | 36 | 37 | 38 | 39 | 52 | 53 | 54 | 55 |
|  | 8 | 9 | 10 | 11 | 24 | 25 | 26 | 27 | 40 | 41 | 42 | 43 | 56 | 57 | 58 | 59 |
|  | 12 | 13 | 14 | 15 | 28 | 29 | 30 | 31 | 44 | 45 | 46 | 47 | 60 | 61 | 62 | 63 |
|  | 64 | 65 | 66 | 67 | 80 | 81 | 82 | 83 | 96 | 97 | 98 | 99 | 112 | 113 | 114 | 115 |
|  | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ⋮ | ized.
PROCESSOR SYSTEM HAVING ADDRESS ALLOCATION AND ADDRESS LOCK CAPABILITY ADAPTED FOR A MEMORY COMPRISED OF SYNCHRONOUS DRAMS

BACKGROUND OF THE INVENTION

The present invention relates to a processor system having memory banks comprising synchronous dynamic random access memories (simply called synchronous DRAMs hereinafter) or like memories.

Heretofore, a main storage required to provide high-speed, high-throughput performance has been mostly composed of static RAMs (SRAMs) with short access times. While it takes a short, substantially equal time (about 10-odd nanoseconds) to access any address in an SRAM chip, the same addressing operation typically takes one hundred and tens of nanoseconds in dynamic RAMs (DRAMs). That is a, SRAM chip has a much shorter access time than other types of memory chips.

The SRAM, however, is lower in the degree of integration and is more expensive than other memory chips such as DRAMs. Using SRAMs to make up a large-capacity main storage can lead to costs that are tens of times as costly as using other types of memories. The cost problem becomes severe particularly with the main storage of a vector processing supercomputer, because that storage is required to have high-speed and large-capacity.

A number of high-speed types of memory have been proposed in recent years and high throughput memory chips called synchronous DRAMs are now on sale, as described illustratively in "Transistor Technology" (a Japanese monthly, the October 1993 issue, pp. 324–331; hereinafter referred to as the reference 1). One characteristic of the synchronous DRAM is that any storage location in the memory is accessed by use of a row address and a column address and that a storage location is accessed by first designating its row address RA followed by its column address CA (see FIG. 13A). Where plural desired storage locations have different column addresses but share the same row address, these locations may be accessed by first designating the row address followed by the column addresses being issued in synchronism with a clock signal. This method of access permits quicker access to these storage locations than any other access method so far (see FIG. 13B). Such mode of operation will be referred to hereunder as the row address lock mode or the row address locked, column address continued access mode.

In FIG. 13, a clock cycle of the synchronous DRAM is assumed to be 15 nanoseconds. It is also assumed that the time period from the time a row address RA is supplied until a column address CA is allowed to be supplied is two clock cycles; that the time period from the time the column address CA is supplied until the first data is provided (for a read) is two clock cycles (the time period is called $\overline{CAS}$ latency); that a precharge time required where the row address RA needs to be supplied again is two clock cycles; and that the access pitch in the row address lock mode is one data item per clock cycle. Reference characters $\overline{RAS}$ stand for a row address assert (strobe) signal and $\overline{CAS}$ for a column address assert (strobe) signal. A trigger operation by the $\overline{RAS}$ and $\overline{CAS}$ signals causes the two addresses successively supplied to this memory to be received into the memory chip as the row address RA and the column address CA, respectively.

The cached DRAM is a memory similar to the synchronous DRAM. The cached DRAM is composed of a DRAM and a cache included in a single integrated circuit. A study on how to apply cached DRAMs to vector type supercomputers is disclosed illustratively by W. -C. Hsu and J. E. Smith in "Performance of Cached DRAM Organizations in Vector Supercomputers," Proc. of the 20th Annual International Symposium on Computer Architecture, pp. 327–336, 1993, IEEE; referred to as the reference 2 hereunder. The reference 2 discusses two types of cached DRAMS. The study shows that either one of the two types of memory permits the same operation as in the row address locked, column address continued access mode. Specifically in the reference 2, two new kinds of address allocation are evaluated comparatively for use in a computer system comprising a plurality of memory banks and a plurality of vector processing computers.

FIG. 15 shows address allocation based on the block interleaving. Under this scheme, addresses starting from 0 are allocated to memory banks 0 through 3 through interleaving; addresses starting from 16 are allocated to memory banks 4 through 7. Thereafter, addresses in units of 16 address locations are allocated to the next four memory banks through interleaving. Such address allocation provides four blocks in which four data items may be accessed concurrently at successive addresses for a read or write operation. It follows that up to four memory access means are given the opportunity of access to the memory. For comparison, FIG. 14 shows address allocation according to the most commonly used interleaving.

Because conventional vector type supercomputers are required to offer high throughput, their main storage is often made up of plural memory banks wherein addresses are allocated by interleaving. The interleaving generally allocates successive addresses to different memory banks so that successive access to such addresses will result in higher memory throughput. A number of variations of the interleaving scheme have been proposed and commercialOne such interleaving scheme is disclosed illustratively in Japanese Laid-Open Patent Application No. Hei 5-165716 and in the corresponding U.S. Pat. No. 5,392,443 (referred to as the reference 3 hereunder).

SUMMARY OF THE INVENTION

In the reference 2, two address allocation schemes are evaluated by use of a model computer system in which any one of the processors may access any one of the memory banks through an interconnecting network.

However, as discussed in the reference 3, many vector type supercomputers are constituted as follows: memory banks constituting the main storage are divided into real bank groups. A processor is connected to the main storage via a storage control unit. The storage control unit has plural priority control circuits each corresponding to one of the real bank groups. Each priority control circuit is supplied with plural requests in parallel from independently operating request circuits in the processors. The requests are issued so as to access one of the memory banks constituting the real bank group connected to the priority control circuit in question. Each priority control circuit selects one of these requests for access to a memory bank.

According to the inventors' research, the relation between the memory banks constituting the main storage and the request circuits in the above kind of supercomputer differs from what is described in the reference 2. As it is, the block interleaving scheme discussed in the reference 2 cannot be applied to a main storage having memory banks grouped into real bank groups, as adopted by conventional vector processing supercomputers.

Further according to the inventors' research, where the main storage of a computer system is to be made of synchronous DRAMs, cached DRAMs or the like which has the row address lock mode, it frequently occurs that independently operating request circuits sequentially access memory locations having different row addresses in the same memory bank. In such a case, the row address to be accessed in each memory bank changes frequently. This leads to fewer occasions which take advantage of the row address lock mode.

It is, therefore, an object of the present invention to provide a processor system having address allocation adapted for accessing memory banks in the row address lock mode, where the memory banks are made up of memories which are operable in the row address lock mode and which are grouped into a plurality of bank groups.

It is another object of the present invention to provide a processor system capable of reducing the number of row address changes resulting from the access by request circuits to memory banks made up of memories operable in the row address lock mode.

In order to attain these objectives, a processor system according to the present invention comprises: a storage device composed of a plurality of memory banks grouped into M real bank groups, where M is an integer of at least 2, each of the real bank groups includes N memory banks, and N is an integer of at least 2; a plurality of request circuits each providing a memory access request to the storage device; and a plurality of priority control circuits connected to the storage device and to the plurality of request circuits and corresponding to the plurality of real bank groups on a one-to-one basis, where the priority control circuits arbitrate memory access requests provided in parallel by the plurality of request circuits so that one of the memory access requests is selectively transferred to the corresponding real bank group. Each of the memory banks is comprised of a memory having a plurality of storage locations each accessed by use of a row address and a column address. The memory is arranged so that a group of storage locations thereof having different column addresses and sharing the same row address may be accessed successively by supplying the row address once and by issuing the different column addresses successively. The plurality of memory banks are grouped into N logical bank groups each having of M memory banks so that M memory banks having memory bank numbers in the same real bank group belong to the same logical bank group. A plurality of address blocks each comprising M×L addresses, L being an integer of at least 2, are allocated successively to different logical groups, and the M×L addresses belonging to each address block are allocated successively in an interleaving manner to M different memory banks belonging to the logical group to which the address block in question is allocated, with the result that L addresses are allocated to each of M memory banks belonging to the logical group in question. Of a plurality of addresses allocated to each memory bank, L addresses belonging to the same address block are allocated to a plurality of storage locations sharing the same row address and having different column addresses.

In a preferred mode for carrying out the present invention, the integer L is smaller than the total number of the group of storage locations sharing the same row address and having different column addresses in each memory bank. The group of storage locations sharing the same row address and having different column addresses includes a plurality of storage locations to which are allocated addresses belonging to a first address block, as well as a plurality of storage locations to which are allocated addresses belonging to at least one other address block.

The preceding feature of the present invention, that is, the group of storage locations sharing the same row address and having different column addresses includes a plurality of storage locations to which are allocated addresses belonging to a first address block, as well as a plurality of storage locations to which are allocated addresses belonging to at least one other address block, may also be applied to a processor system wherein the memory banks are not divided into real bank groups.

In another preferred mode for carrying out the present invention, the priority control circuit includes: a selection circuit for selecting at least one of a plurality of memory access requests provided in parallel by the plurality of request circuits, where the selected memory access request is granted permission for memory access; a plurality of row address storage devices corresponding to the plurality of memory banks on a one-to-one basis, where each of the row address storage devices stores the row address of a storage location in the memory bank in question, and that storage location is one accessed by the preceding memory access request most recently selected by the selection circuit; a detection circuit for detecting coincidence between two row addresses, where one of the two row addresses is one which is allocated to a storage location in a memory bank, and that storage location is one accessed by each of the plurality of memory access requests provided in parallel by the plurality of request circuits, where the other row address is one stored in the row address storage device corresponding to the memory bank in question; and a selection control circuit for controlling the selection circuit depending on the result of coincidence detection by the detection circuit regarding each of the plurality of memory access requests.

In a further preferred mode for carrying out the present invention, the selection control circuit includes a control circuit for controlling the selection circuit so that a memory access request for which row address coincidence was detected by the detection circuit is selected in preference to another memory access request for which row address coincidence was not detected by the detection circuit.

To be more desirable, the plurality of request circuits each include: a memory access request output circuit for providing a series of memory access requests; and a lock/unlock request circuit for providing a lock request requesting the locking of one row address in one of the plurality of memory banks, where the lock/unlock request circuit further provides an unlock request requesting thereafter the unlocking of the row address in the single memory bank. The priority control circuit includes: a lock information storage device for storing information indicating that in response to a lock request provided by the lock/unlock request circuit included in one of the plurality of request circuits, where the row address designated by the lock request in the memory bank designated by the lock request is locked by the request circuit in question; the lock information storage device further stores information indicating that the row address in the memory bank is unlocked thereafter in response to an unlock request provided by the lock/unlock request circuit; a detection circuit for checking, on the basis of the information stored in the lock information storage device, whether a first condition is met which requires that for each of the plurality of memory access requests provided in parallel by the plurality of request circuits, the memory bank accessed by the memory access request in question should coincide with the memory bank having a row address locked by a request circuit other than the request circuit having provided the memory access request; the detection circuit further checks, on the basis of the information stored in the lock information storage device, whether a second condition is met which requires that when the memory access request meets the first condition, the row address designated by the memory access request should coincide with the row address locked by the other request circuit; and a selection control circuit for controlling the selection circuit depending on the result of coincidence detection by the detection circuit regarding each of the plurality of memory access requests.

To be more specific, the selection control circuit includes a control circuit for controlling the selection circuit so that a memory access request provided by one of the request circuits and detected by the detection circuit as one which has not met at least one of the first and the second conditions is selected in preference to another memory access request provided by another request circuit and detected by the detection circuit as one which has met the first condition but has not met the second condition.

These and other objects, features and advantages of the invention will become more apparent upon a reading of the following description and appended drawings

BRIEF DESCRIPTION OF THE DRAWINGS

FIG. 2 illustrates address allocation to the main storage in the vector processor of FIG. 1;

FIG. 13A is a timing chart of a conventional synchronous DRAM when the row address lock mode is used;

FIG. 13B is a timing chart of a conventional synchronous DRAM when the row address lock mode is not used;

FIG. 14 shows typical addresses allocated according to the conventional interleaving scheme;

FIG. 15 shows typical addresses allocated according to the conventional block interleaving scheme.

DESCRIPTION OF THE PREFERRED EMBODIMENT (1) Outline of the Vector Processor

Figure 1:
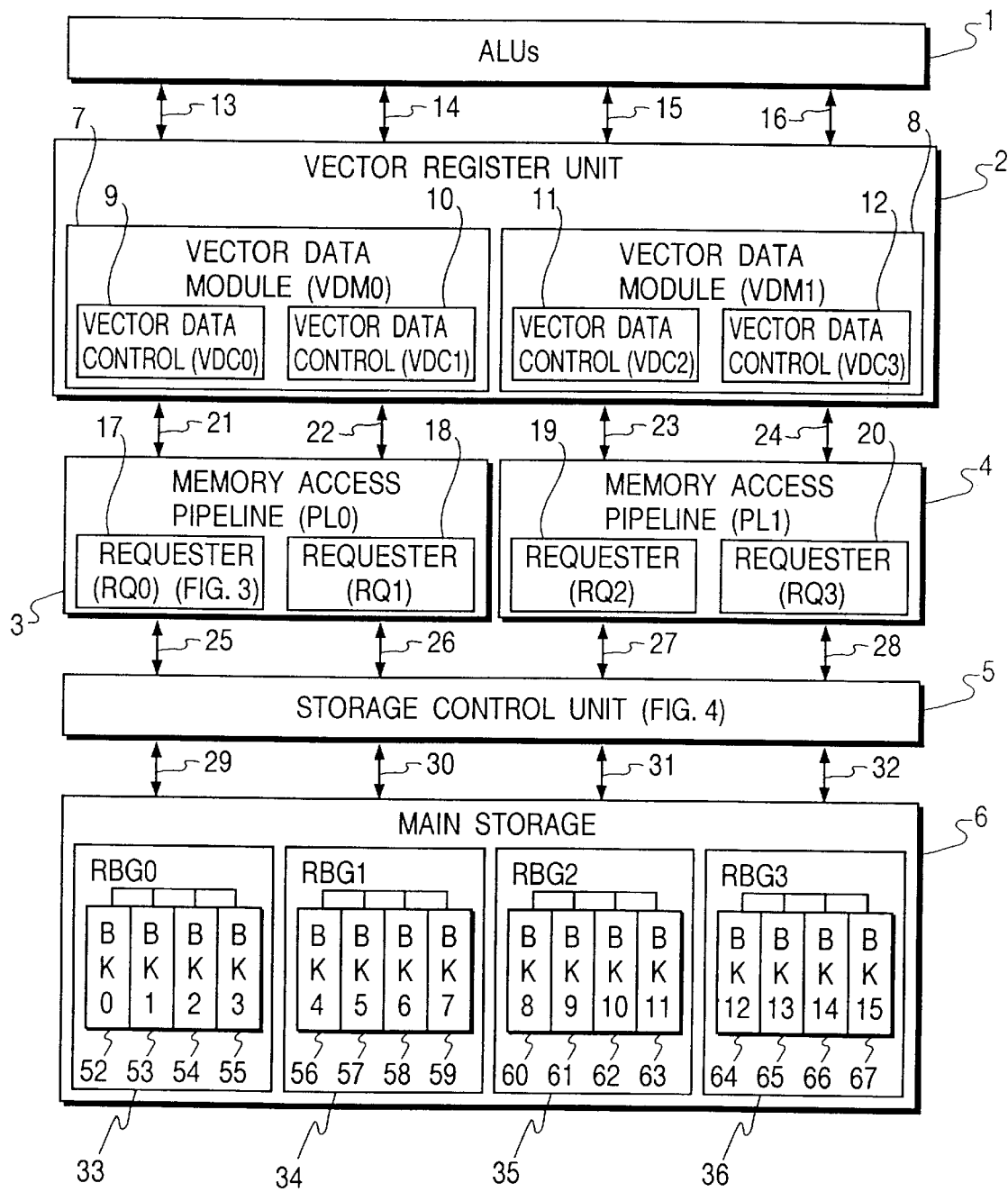
FIG. 1 is a schematic block diagram of a main part of a vector processor according to the present invention.

FIG. 1 schematically shows major components of a vector processor according to the present invention. The vector processor comprises arithmetic and logic units (ALUs) 1, a vector register unit (VRU) 2 including vector registers (not shown), memory access pipelines (PL0, PL1) 3 and 4, a storage control unit (SCU) 5 and a main storage (MS) 6.

Main storage access instructions usable in the vector processor of the embodiment are a load and a store instruction. The load instruction is one for loading vector data from the main storage 6 into one of the vector registers. The store instruction is one for storing vector data from one of the vector registers into the main storage 6.

The vector register unit 2 comprises two vector data control modules (VDM0, VDM1) 7 and 8. The two modules execute different vector instructions in parallel. The vector data control module 7 or 8 comprises two vector data control circuits (VDC0 and VDC1 or VDC2 and VDC3) 9 and 10 or 11 and 12.

The vector data control modules 7 and 8 are connected to the memory access pipelines 3 and 4, respectively. The vector data control circuits 9 and 10 (or 11 and 12) provide access requests in response to the same memory access instruction, so as to access in the so-called double element parallel operation the vector data designated by the instruction for access. More specifically, the vector data control circuit 9 provides a memory access request to access a group of even-numbered elements of the vector data. The memory access request includes a base address indicating the address of the first of the even-numbered elements (i.e., the first vector element, element 0 in this example), a stride indicating the address difference of the successive even-numbered vector elements, and a vector length indicating the number of vector elements in the group of even-numbered elements to be accessed. The memory access request is sent to a memory requester 17 in the memory access pipeline 3. Likewise, the vector data control circuit 10 provides a memory access request to a memory requester 18 in the memory access pipeline 3 in order to access a group of odd-numbered elements of the vector data in question. The vector data control circuits 11 and 12 supply memory requesters 19 and 20 in the memory access pipeline 4 with similar access requests in response to a vector instruction different from the vector instruction mentioned above.

The vector register unit 2 further includes vector registers (not shown) as mentioned. The vector register unit 2 transfers the vector data designated by a memory access instruction from the main storage 6 to one of the vector registers or vice versa through the vector data control modules 7 (or 8), paths 21 and 22(or 23 and 24), the requesters 17 and 18 (or 19 and 20) in the memory access pipelines 3 (or 4), paths 25 and 26 (or 27 and 28), and the storage control unit 5. Each vector register is capable of having two vector elements written thereinto or read therefrom in the double element parallel operation. The circuit portions associated with the writing and reading of data to and from the vector registers are of known type and are thus omitted from FIG. 1 for simplification.

Responding to a memory access request from the vector data control circuits 9 and 10 (or 11 and 12), the requesters (RQ0, RQ1 or RQ2, RQ3) 17 and 18 (or 19 and 20) in the memory access pipeline 3 (or 4) send requests to the storage control unit 5 via the paths 25 and 26 (or 27 and 28). The latter requests are requests to groups of vector elements designated by the requests provided from the vector data control circuits 9 and 10 (or 11 and 12).

The storage control unit (SCU) 5 arbitrates requests provided from the memory requesters 17 through 24 and sends the requests to the main storage 6.

The main storage (MS) 6 comprises four real bank groups (RBG0–RBG3) 33 through 36. The real bank groups 33 through 36 each includes four memory banks (BK0–BK3, BK4–BK7, BK8–BK11, BK12–BK15) 52 through 55, 56 through 59, 60 through 63 and 64 through 67.

The real bank groups 33 through 36 are each capable of dealing with one request per machine cycle. That is, the entire main storage 6 can process four requests in parallel per machine cycle.

The above-described configuration of the vector processor and its operation are of known type. The embodiment has each memory bank composed of synchronous DRAMs or cached DRAMs similar to the synchronous DRAM. As will be discussed later, the memory banks are allocated addresses in such a manner that elements within a group of vector elements successively accessed by a memory access request sent from the vector data control module 7 or 8 may be read as much as possible from the memory banks in the row address lock mode specific to the synchronous DRAM or the like, where the column address alone is changed and a row address RA is not repeatedly applied.

The storage control unit 5 is constructed so as to arbitrate requests from the vector data control modules 7 and 8, so that the row address lock mode of the synchronous DRAMs will be taken advantage of as much as possible, when the storage control unit 5 is accessing a group of vector elements requested by a memory access request from one of the vector data control modules (e.g., module 7), and at the same time another request is received from the other vector data control module (e.g., module 8) for access to one of the memory banks. In such cases, the contention between the two access requests from the vector data control modules 7 and 8 is arbitrated thereby.

Illustratively, if it is sure that one of the vector data control modules (e.g., module 7) will subsequently access the same row address in a memory bank as previously accessed by that vector data control module 7, the storage control unit 5 gives the access right to a subsequent request for access to that memory bank from the vector data control module 7, in preference to an access request from the other vector data control module 8. This scheme reduces the number of times the row address is changed regarding the memory bank in question, whereby the throughput of the memory as a whole is improved. However, giving the access right successively to requests from the same vector data control module (e.g., 7) would necessarily leave an access from the other vector data control module (e.g., 8) unaccepted. Therefore, the number of times the access right (or right-of-access) is given successively to the same vector data control module is limited within a predetermined value.

(2) Address Allocation

In FIG. 2, the item RBG# stands for the bank group number of each of the real bank groups 33 through 36; Bka# for the number of each of the memory banks 52 through 67 within the real bank group to which the memory bank in question belongs; BK# for the number of each of the memory banks 52 to 67 throughout the entire real bank groups; and LBG# for the number of a logical bank group (to be described later) to which each memory bank belongs. In the description that follows, each real bank group may be referred to where appropriate as, say, RBG0 using the number of the real bank group (0 in this case) in question. Each logical bank group may likewise be referred to illustratively as LBG0 using the number of the logical bank group (also 0 in this case) in question.

A logical bank group is a group of memory banks defined throughout the entire real bank groups. More specifically, the i-th logical bank group LBGi (i=0, 1, 2 or 3) is composed of the i-th memory bank in each real bank group. The memory banks constituting each logical bank group all belong to different real bank groups. The number LBG# of the logical bank group to which a given memory bank belongs is the same as the memory bank number Bka# of the memory bank in question within the corresponding real bank group. Thus, each memory bank is specified either by combination of a real bank group number RBG# and a memory bank number Bka# within the corresponding real bank group, or by combination of a real bank group number RBG# and a logical bank group number LBG#.

The address allocation shown in FIG. 2 is a kind of block interleaving, and is implemented as follows. Different address blocks each composed of 64 successive addresses are allocated to sequentially varying logical groups. The 64 addresses in each address block are allocated in an interleaving scheme to four memory banks belonging to the logical group to which the address block in question is allocated. That is, the first 64 addresses from address 0 to 63 constituting the first address block are allocated in an interleaving scheme to memory banks BK0, BK4, BK8 and BK12 belonging to the logical bank group LBG0. Addresses 64 through 127 constituting the second address block are allocated likewise to memory banks BK1, BK5, BK9 and BK13 belonging to the logical bank group LBG1. Addresses 128 through 191 constituting the third address block are similarly allocated to memory banks BK2, BK6, BK10 and BK14 belonging to the logical bank group LBG2. Addresses 192 through 255 constituting the fourth address block are allocated in like manner to memory banks BK3, BK7, BK11 and BK15 belonging to the logical bank group LBG3. Furthermore, the next 64 addresses starting from address 256 and constituting the next address block are again allocated to the memory banks BK0, BK4, BK8 and BK12 belonging to the logical bank group LBG0. The subsequent addresses are also allocated in like manner.

Each memory bank is constituted by a single synchronous DRAM. Each storage location in the memory is accessed by use of a row address RA and a column address CA. Although row and column addresses are not limited to any specific values, it is assumed for this embodiment that the column address CA illustratively takes any one of 512 values from 0 to 511. In FIG. 2, reference characters RA and CA denote the row and column addresses allocated to the storage locations in each memory bank addressed as described. For example, addresses 0 through 3 are allocated row address 0, column address 0 of the four memory banks in the logical bank group LBG0. Likewise, addresses 4 through 7 are allocated row address 0, column address 1 of the four memory banks in the logical bank group LBG0. As can be seen in FIG. 2, addresses 0 through 255 are allocated row address 0, column address 0 through row address 0, column address 15 of 16 memory banks in the logical bank groups LBG0 through LBG3. Similarly, addresses 256 through 2,047 are allocated row address 0, column address 16 through row address 0, column address 511 of 16 memory banks in the logical bank groups LBG0 through LBG3. The ensuing addresses from 2,048 on are allocated row address 1 and subsequent row addresses of these memory banks.

In more general terms, if N represents a number of real bank groups and M represents a number of memory banks in each real bank group, address blocks each composed of M×L (L is an integer of at least 2) addresses are each allocated to a different logical group. The M×L addresses belonging to each address block are allocated in an interleaving manner to M memory banks belonging to the logical group to which the address block in question belongs.

That is, a plurality of address blocks composed of addresses ranging from address ((i−1)+N(j−1))×M×L+1) to address $((i+N(j-1))\times M\times L)(i=1, 2, \ldots, \text{or } M; j=1, \ldots)$ are allocated in an interleaving manner to N memory banks belonging to the i-th logical group. As a result of this, L addresses are allocated to each of M memory banks belonging to each logical group. In the example of FIG. 2, N, M and L take the values of 4, 4 and 16 respectively. Of the addresses allocated to each memory bank, L addresses belonging to the same address block are allocated to storage locations sharing the same row address and having different column addresses.

In a processor system in which memory banks are divided into real bank groups and in which a priority circuit arbitrates an access right to each bank group, the above-described address allocation based on the block interleaving method allows the row address lock mode of synchronous DRAMs to be taken advantage of more frequently.

For example, in case the vector data control module 7 (or 8) accesses a series of successive addresses starting from address 0, memory access requests are issued to the memory banks BK0, BK4, BK8 and BK12 only. As the vector data control module 7 (or 8) accesses two addresses per cycle in a double element parallel operation, the memory access request is issued to the memory banks BK0 and BK4 for addresses 0 and 1 therein, in a first cycle. In a second cycle, the request is issued to the memory banks BK8 and BK12 for addresses 2 and 3 therein. In a third cycle, the request is issued again to the memory banks BK0 and BK4 for addresses 4 and 5 therein. In this case, it is necessary to set row address 0 initially to the memory banks to which the first four requests are issued. When the next four requests are issued to these memory banks, row address 0 need not be set anew and only column addresses need to be set, as the previously set row address is utilized. Thus, the row address lock mode is used in which the column address alone is changed for successive accesses while the row address is kept unchanged.

In this embodiment, the total number L of addresses (16 in the example above) allocated to the same row address in the same memory bank is selected to be smaller than the total number of storage locations (512 in the example above) having the same row address in the same memory bank. Preferably, the total number L is selected to be a fraction 1/n multiplication, where n is an integer of at least 2. (1/32 for the embodiment) of the total number of storage locations (e.g., 512) having the same row address in the same memory bank. This causes the same row address in each memory bank to be allocated to addresses belonging to a plurality of address blocks.

As will be described later in more detail, the embodiment is constructed so as to operate as follows. Where a series of memory requests among a series of access requests generated by an access request provided from the vector data control module 7 or 8 access the same memory bank, that memory bank is locked for the series of memory requests from the time a memory request which first accesses the memory bank is executed until a memory request which last accesses the memory bank has been executed. While the memory bank is locked, priority is lowered to memory requests which access that memory bank for the other vector data control module. This allows the row address lock mode to be taken advantage of more often when addresses belonging to the locked row address in the memory bank in question are accessed.

This, however, necessarily leads to a state in which the locked memory bank remains virtually monopolized by the same requester. The situation is not desirable where memory requests from different requesters should be processed as equally as possible.

In general, addresses belonging to the same memory bank and the same address block are highly likely to be accessed successively by one requester. If addresses having the same row address assigned belong to plural address blocks, the period in which that row address is maintained in the locked mode will become shorter than the case where the addresses having that row address belong to one address block. With a view to utilizing the low address lock mode as much as possible, while averting excessive memory bank monopoly by a particular requester, it is preferable to select an address block size such that addresses belonging to plural address blocks are allocated to one row address.

(3) Requesters

Figure 3:
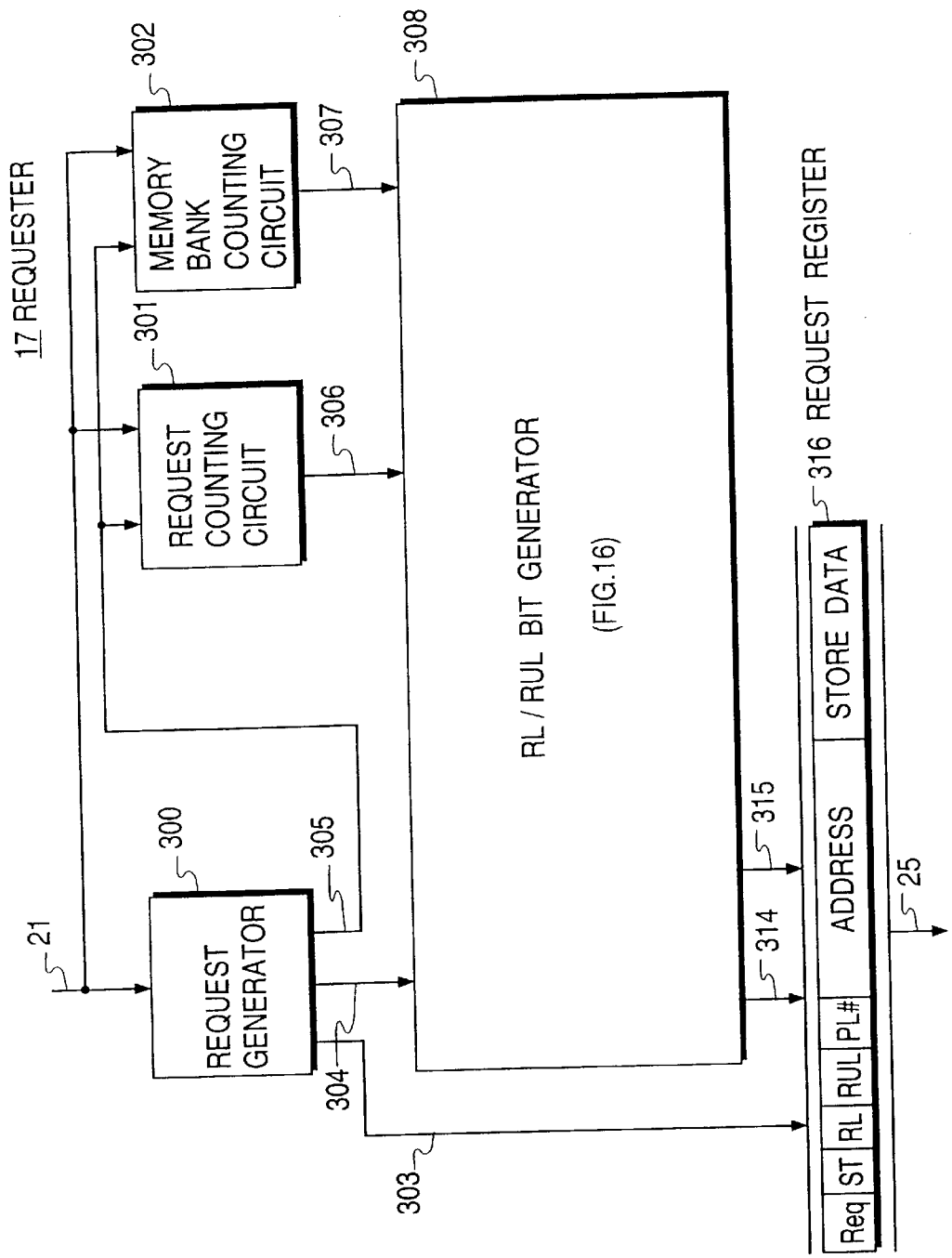
FIG. 3 is a block diagram of a requester used in the vector processor of FIG. 1.

Referring to FIG. 3, a request generator 300 sequentially calculates addresses of a group of even-numbered vector elements within vector data to be accessed in the main storage 6 on the basis of the base address, stride and vector length which are given by the vector data control circuit 9 via the path 21 and which designate that group of even-numbered vector elements. The request generator 300 sequentially generates requests containing respective addresses at a rate of one request per one cycle. The generated request is placed into a request register 316 via a path 304. As illustrated in the request register 316 in FIG. 3, each request generated by the request generator 300 comprises a request flag Req indicating that the request in question is valid, an ST flag indicating whether or not the request is a store request, the number PL# of the memory access pipeline to which the requester having issued the request belongs, a memory address, and store data included in the request if the request is a store request. Of these items of information, those excepting the memory access pipeline number PL# and the memory address are supplied by the corresponding vector data control circuit 9. The memory access pipeline number PL# and the memory address are added by the requester 17. The memory access pipeline number PL# takes on 0 or 1 to represent the memory access pipeline 3 or 4, respectively. Furthermore, the request generator 300 provides onto paths 304 and 305, an element number ELM# indicating which element within the vector data requested by the corresponding vector data control module 7 a vector element to be accessed by a request generated by the request generator is. The element number ELM#, starting from 0, is a number indicating where the currently processed request stands in a group of requests issued by the requester 17 for a group of even-numbered (or odd-numbered) vector elements accessed sequentially by the requester 17. The internal structure of the request generator 300 for generating such requests is of known type and will not be described further for simplification.

The requester 17 has a feature that it generates a row address lock bit RL ad a row address unlock bit RUL, as follows. A request counting circuit 301 responds to the base address, stride and vector length fed via the path 21 as well as the element number supplied from the request generator 300 over the path 305, and calculates the total number NR0 of requests which includes a request currently being processed by the requester 17 and the subsequent requests expected to be issued by the same requester 17 and to access the logical bank group to be accessed by the request currently being processed. This number NR0 may also be called the same logical bank group successive access request count. For example, suppose that the base address, stride and vector length are 0, 2 and 32, respectively, and that the element number of the request currently being processed is 0 (i.e., the first request). In that case, as can be seen in FIG. 2, the number NR0 is 32, because 32 requests access addresses 0, 2, 4, . . . , 62 in the logical bank group LBG0 being accessed by the first request.

A memory bank counting circuit 302 responds to the base address, stride and vector length given via the path 21 as well as the element number ELM# of the request currently being processed fed by the request generator 300 via the path 305, and calculates the total number NBK of those memory banks which are accessed either by the request currently being processed or by subsequent requests to be issued by the same requester 17, among memory banks included in the memory bank group to be accessed by the request currently being accessed. This number of memory banks may also be called the intra-logical-group accessed memory bank count. For example, suppose that the base address, stride and vector length are 0, 2 and 32, respectively and that the element number of the request currently being processed is 0. In that case, as can be seen in FIG. 2, the total number of memory banks NBK is 2, because all requests access the memory bank BK0 or BK2 in the logical bank group LBG0 being accessed by the current request.

Figure 16:
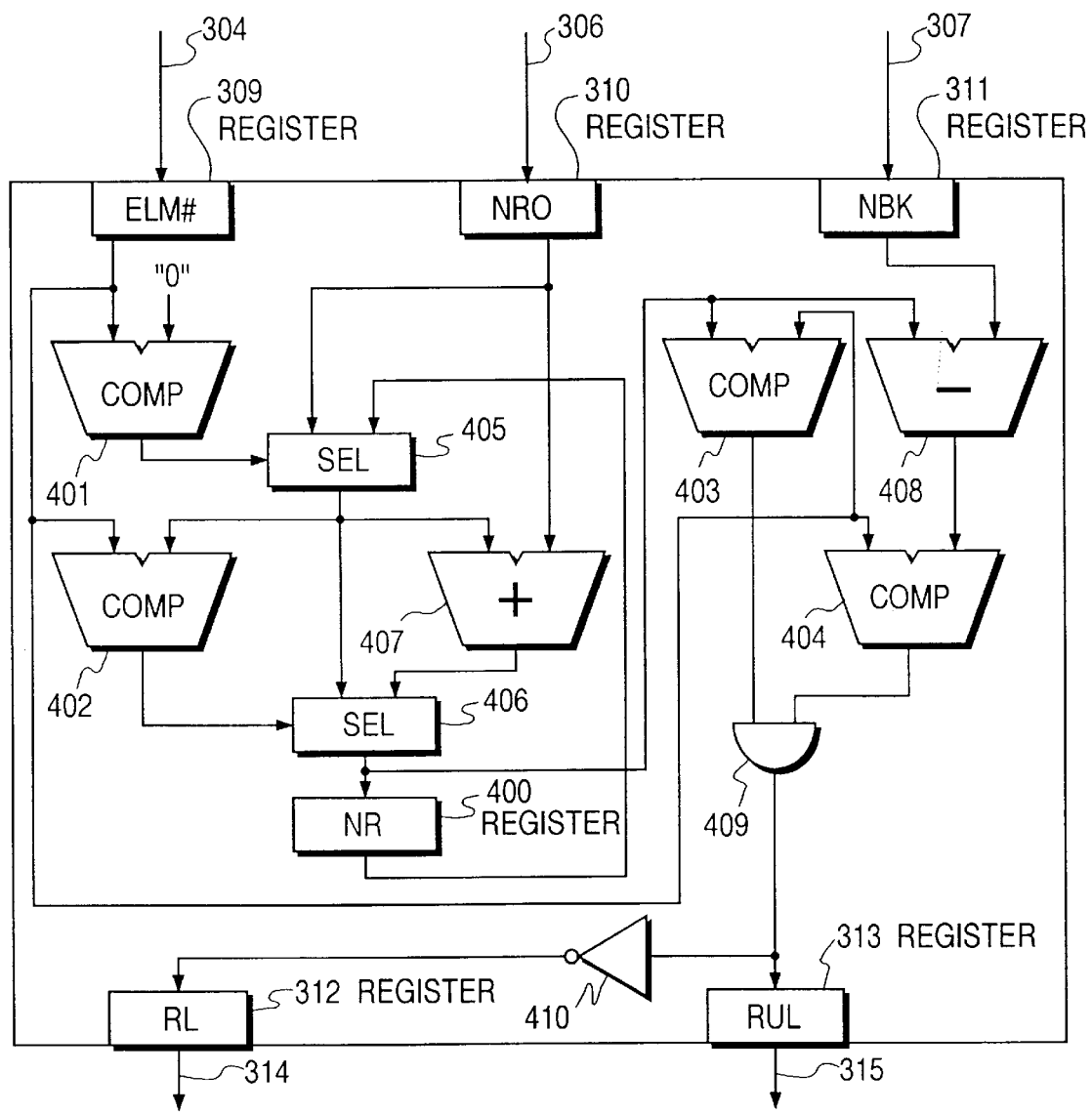
FIG. 16 is a schematic block diagram of an RL/RUL bit generator of FIG. 3.

Referring to FIG. 16, an RLL bit generator 308 receives the above-described numbers NR0 and NBK via paths 306 and 307 and places them into a request count register 310 and a memory bank count register 311, respectively. In addition, the RL/RUL bit generator 308 receives the element number ELM# of the currently processed request from the request generator 300 via the path 304, and places that number into an element number register 309.

The RL/RUL bit generator 308 generates the row address lock bit RL and row address unlock bit RUL for each of the requests successively accessing a given logical bank group, so that a row address lock bit RL is 0 and a row address unlock bit RUL is 1 for the last one of the requests and a row address lock bit RL is 1 and a row address unlock bit RUL is 0 for the remaining requests.

The present embodiment assumes that when plural addresses among a series of addresses provided by one requester access the same memory bank, the addresses belong to the same row address. Thus, the RL/RUL bit generator 308 generates a row address lock bit RL of 1 for all memory access requests accessing the same row address except for the last one of those requests, and generates a row address unlock bit RUL of 1 for that last one. If a series of memory access requests provided by the same requester are to access plural addresses belonging to plural row addresses in the same memory bank, the RL/RUL bit generator 308 of FIG. 16 may be modified so that those addresses in the series of addresses which belong to one of the row addresses are subjected to the above-described processing.

Specifically, a comparator 401 checks if the element number ELM# is 0, i.e., if the request generated by the request generator 300 is the first request. If the element number ELM# indicates that the request in question is the first request, the comparator 401 makes a selector 405 select NR0 in the request count register 310. If the request is not the first request, the comparator 401 makes the selector 405 select a variable register 400.

A comparator 402 then checks if the output of the selector 405 is smaller than the element number ELM#. Furthermore, an adder 407 adds the output of the selector 405 and NR0, i.e., the content of the request count register 310. If the output of the selector 405 is found to be equal to or smaller than the element number ELM#, the comparator 402 makes a selector 406 select the output of the adder 407. The output of the adder 407 is placed as a new variable NR into the variable register 400. If the output of the selector 405 is found to be greater than the element number ELM#, the comparator 402 makes the selector 406 select the output of the selector 405.

The processing above enables the variable register NR to hold a value greater by 1 than the maximum element number among the requests that are to successively access the logical bank group being accessed by the request currently being processed.

A subtracter 408 then subtracts the content NBK of the memory bank count register 311 from the output of the selector 406. A comparator 404 checks if the element number ELM# is 4 equal to or greater than the output of the subtracter 408. A comparator 403 checks if the element number ELM# is smaller than the variable number NR. The outputs of the comparators 403 and 404 are supplied to an AND gate 409 whose output is placed as the row address unlock bit RUL onto a path 315 via a row address unlock register 313. The output of the AND gate 409 is also supplied to an inverter 410 whose output is placed as the row address lock bit RL onto a path 314 via a row address lock bit register 312. Thus, if the two checks by the two comparators 403 and 404 are found to be unsuccessful, the row address lock bit RL is set to 0 and the row address unlock bit RUL is set to 1. Otherwise the row address lock bit RL is set to 1 and the row address unlock bit RUL is set to 0.

The request generated by the request generator 300 and the bits RL and RUL generated by the RL/RUL bit generator 308 are sent over paths 303, 314 and 315 to a request register 316 and merged thereby into a memory access request. In this manner, the row address lock bit RL and row address unlock bit RUL are generated for each request. The same holds for the requesters 18 through 20.

(4) Storage Control Unit (SCU)

Figure 4:
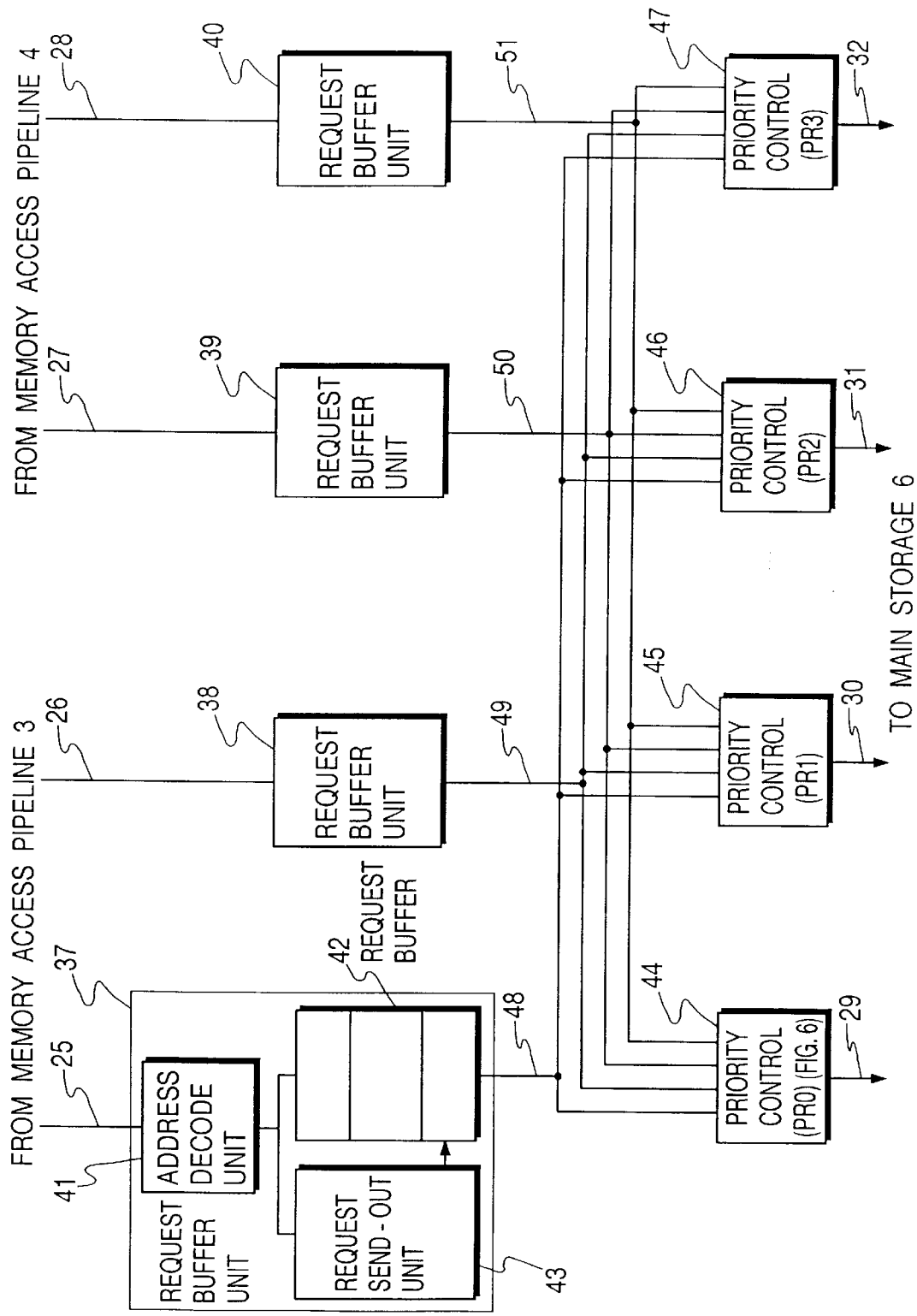
FIG. 4 is a block diagram of a storage control unit used in the vector processor of FIG. 1.

As shown in FIG. 4, the storage control unit 5 comprises four request buffer units 37 through 40 of an identical structure corresponding to the four requesters 17 through 20 respectively, and four priority control circuits (PR0–PR3) 44 through 47 of an identical structure corresponding to the four real bank groups 33 through 36. For purpose of simplification, FIG. 4 omits paths on which the vector data read from the main storage 6 in response to a load instruction is to be transferred to the vector register unit 2 (FIG. 1).

(4A) Request Buffer Units

Figure 5:
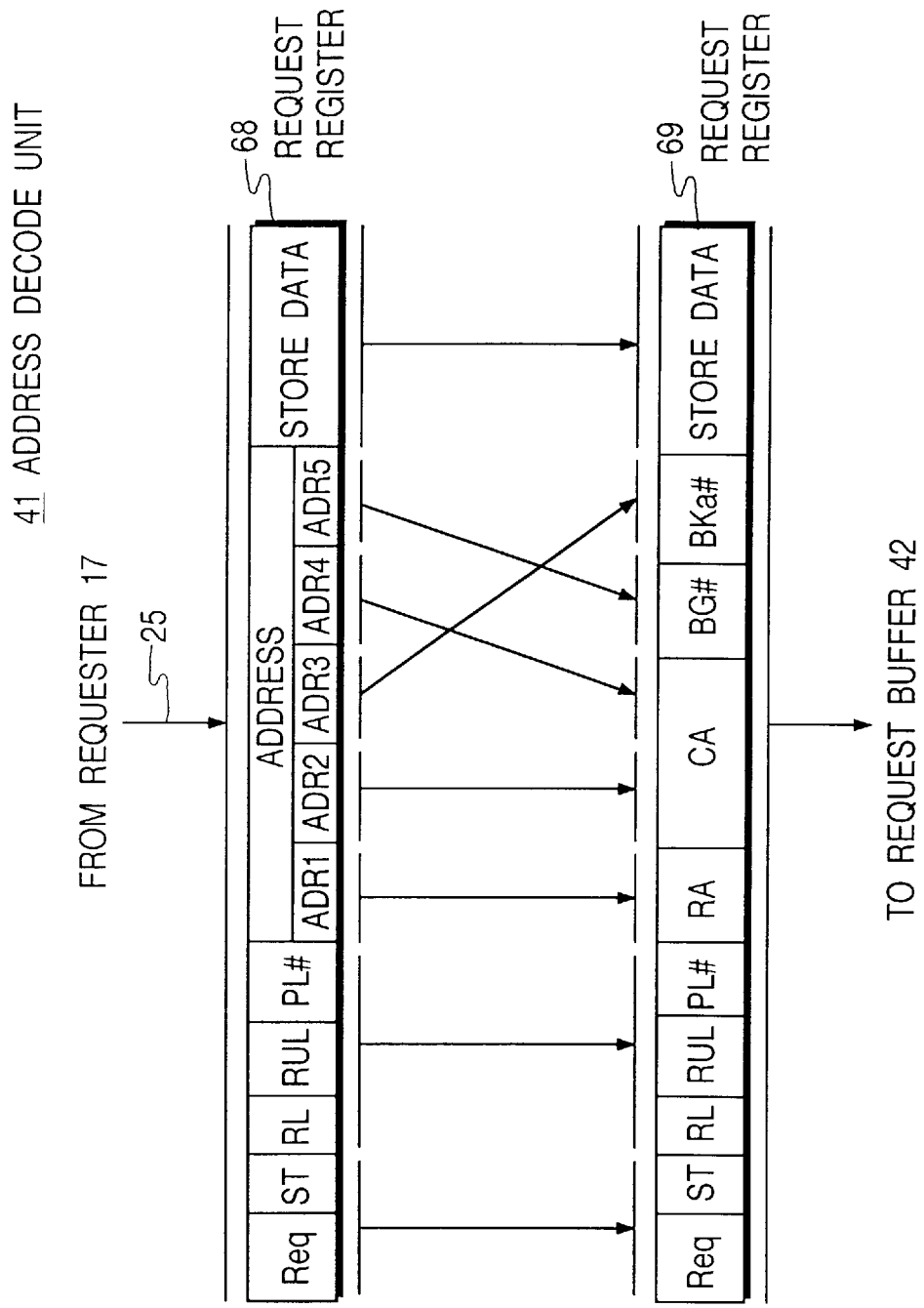
FIG. 5 is a block diagram of an address decoder unit used in the storage control unit of FIG. 4.

In the request buffer unit 37, an address decoder unit 41 makes a request register 68 hold a request fed from the requester 17 via the path 25, as depicted in FIG. 5. The address in the request is translated in preparation for an access operation based on the address allocation specific to the synchronous DRAM and shown in FIG. 2. The address translation generates a request including the translated address comprising a real bank group number RBG#, a memory bank number Bka# within the corresponding real bank group, and an intra-memory-bank address. The intra-memory-bank address is composed of a row address RA and a column address CA. The request thus generated anew is held in a request register 69.

The address is divided into five fields before getting translated. With this embodiment, as shown in the address allocation example of FIG. 2, the fifth field (the lowest field) ADR5 of the yet-to-be translated address determines the real bank group number RBG#. Since the number of real bank groups is 4 with this embodiment, the lowest field ADR5 is made up of two bits. The third field ADR3 of the address determines the memory bank number Bka# within the corresponding real bank group. Since the total number of memory banks in each real bank group is 4 with this embodiment, the third address field ADR3 is also made up of two bits. As indicated in FIG. 2, the bank number within the real bank groups changes at intervals of 64. Thus, the total number of bits in the fourth and the fifth address fields is 6. It follows that the fourth address field ADR4 is composed of four bits. The second and the fourth fields of the yet-to-be translated address determine the column address CA. With this embodiment, as described in connection with FIG. 2, 512 column addresses are assumed to exist regarding the same row address RA. This means that the column address CA is made up of nine bits. Consequently, the second address field ADR2 is composed of five bits. The first address field ADR1 before the translation is used unchanged as the row address RA. As a result of this, yet-to-be translated addresses 0 through 2,047 of the embodiment correspond to the storage locations at row address RA of 0 in a given memory bank of a given real bank group. For each of these addresses, the column address CA varies from 0 to 511. When the address exceeds location 2,047, the row address is incremented by 1. That is, the row address is incremented by 1 at intervals of 2,048 yet-to-be translated addresses.

Returning to FIG. 4, the request buffer unit 37 holds temporarily the request issued by the requester 17. Thereafter the request buffer unit 37 sends out the request, under control of a request send-out unit 43, via one of paths 48 through 51 to one of the priority control circuits 44 through 47 which is designated by the real bank group number RBG# in that request. The internal constitution of the request buffer 42 and the request send-out unit 43 is disclosed in detail in the above-cited reference 3. Detailed descriptions of these units are omitted hereunder for simplification. The techniques described in the reference 3 are incorporated herein by reference.

(4B) Priority Control Circuits

The priority control circuits 44 through 47 are each supplied simultaneously with up to four requests from the request buffer units 37 through 40. That is, four requests provided by the four requesters 17 through 20 in the two memory access pipelines 3 and 4 can be sent simultaneously to each priority control circuit via the four request buffer units 37 through 40. Upon receipt of a plurality of requests, each priority control circuit arbitrates memory access contention between the requests and selects them one at a time. The selected requests are sent successively to one of the real bank groups 33 through 36 which corresponds to the priority control circuit in question.

The present embodiment has a feature in arbitrating two requests associated with the memory access pipelines 3 and 4 so as to maximize the number of times the row address lock mode, specific to the synchronous DRAM, is utilized. More specifically, a row address locking circuit is incorporated in the embodiment, so that when a request from one access pipeline attempts to access a row address in the memory bank of which another row address has been locked by the other memory access pipeline, a new request is given priority over the request from one memory access pipeline.

Figure 6:
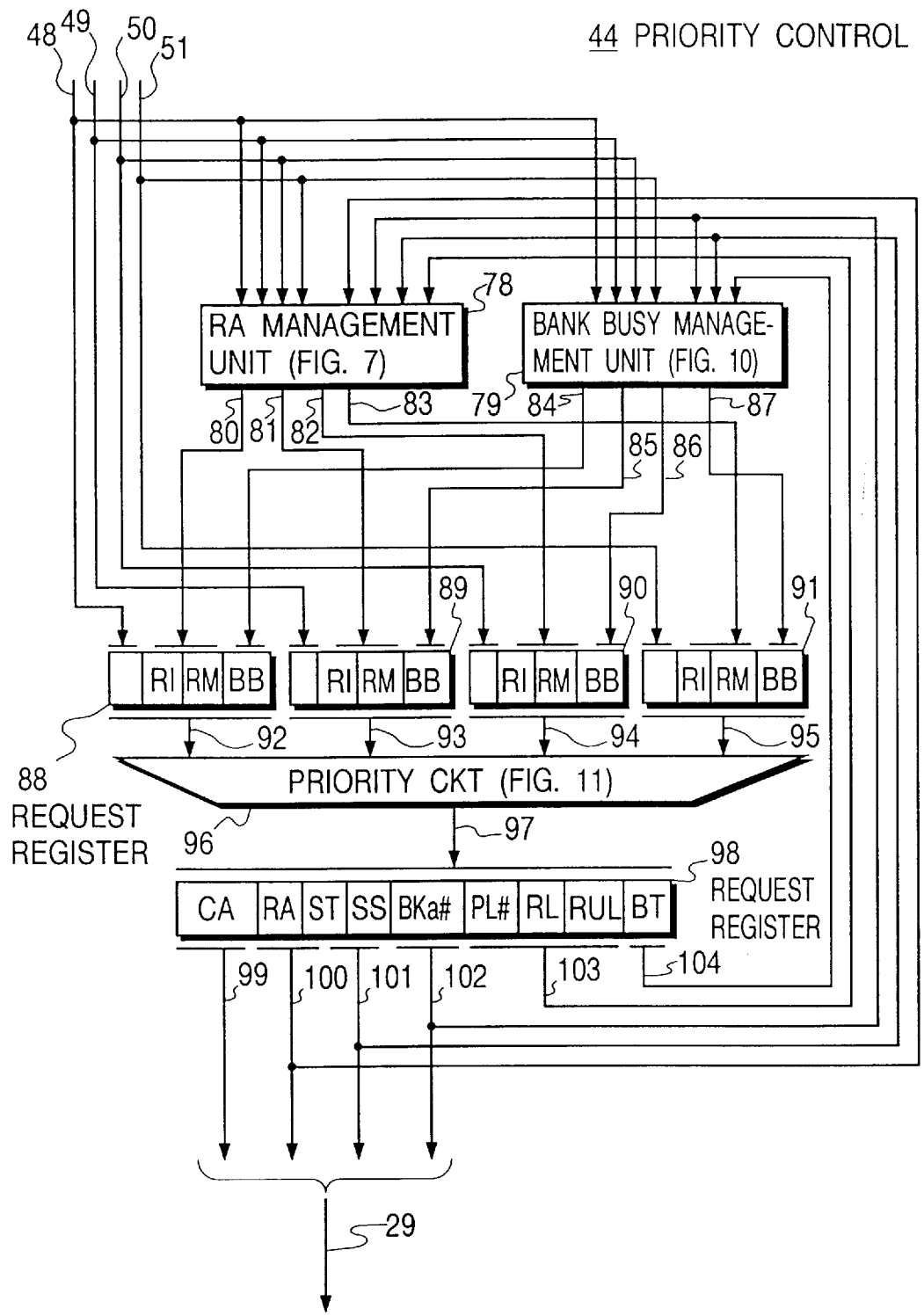
FIG. 6 is a block diagram of a priority control circuit used the storage control unit of FIG. 4.

Referring to FIG. 6, each priority control circuit, e.g., 44, comprises an RA management unit 78, a bank busy management unit 79, request registers 88 through 91 and 98, and a priority circuit 96. The request registers 88 through 91 are respectively provided in correspondence to the request buffer units 37 through 40. Each request register holds a combination of an RA coincidence bit RM and an RA change inhibit bit RI both generated by the RA management unit 78 for a succeeding request sent out by one of the request buffer units 37 through 40, as well as a bank busy bit BB generated by the bank busy management unit 49 for the succeeding request. If the request held in one of the request registers 88 to 91 is not immediately selected by the priority circuit 96, the unselected request is supplied repeatedly over one of the paths 48 through 51 to the one request register. The request register in question thus holds the request repeatedly in each cycle. At the same time, given the request fed repeatedly via one of the paths 48 through 51, the RA management unit 78 determines in each cycle a new RA coincidence bit RM and a new RA change inhibit bit RI depending on the request selected anew by the priority circuit 96. Likewise, given such requests, the bank busy management unit 79 generates a new bank busy bit BB in each cycle.

The RA management unit 78 stores the request that has most recently accessed each of the four memory banks within the real bank group corresponding to the priority control circuit in question. Every time a new succeeding request is sent from the request buffer unit 37 via one, e.g., 48 of the paths 48 through 51, the RA management unit 78 compares two row addresses. One row address RA is that of a preceding request, as stored corresponding to the memory bank having the memory bank number Bka# within the real bank group designated by the succeeding request. The other row address RA is that of the succeeding request. If the two row addresses are found to match, the RA management unit 78 provides via a path 80 an RA coincidence bit of 1 to the request register 88 corresponding to the requester buffer unit 37 that sent out the succeeding request.

Furthermore, if the two row addresses are found to match as a result of the compare operation, the RA management unit 78 operates as follows. Where the memory bank has been locked by the preceding request, the RA change inhibit bit RI to be supplied to the request register 88 is set to 1 for the succeeding request. More specifically, it may happen that, of a group of requests issued by one of the requesters, e.g., 19 in one memory access pipeline, e.g., 4 which access a group of even-numbered vector elements, a number of already executed preceding requests have accessed one memory bank, that the succeeding requests to be executed among the group of requests are to access the same memory bank, and that the row address RA designated by the preceding requests coincides with the row address RA specified by the succeeding requests. In that case, the RA management unit 78 locks the row address RA of the memory bank in question. Suppose that a row address in a given memory bank has been locked for one memory access pipeline, e.g., 4, and that a yet-to-be executed succeeding request issued by a request buffer unit, e.g., 37 based on the memory request from the other memory access pipeline, e.g., 3 is to access a storage location at a different row address in the same memory bank. In such a case, the RA management unit 78 sets to 1 the RA change inhibit bit RI given to the succeeding request so that the current row address will not be changed with respect to the succeeding request. Details of the RA management unit 78 will be discussed later.

The bank busy management unit 79 stores a bank busy time BT indicating the period of time in which each of the memory banks within the corresponding real bank group is expected to remain busy. When a succeeding request is supplied over one of the paths 48 through 51, e.g., 48 as described above, the bank busy management unit 79 references the bank busy time BT stored in correspondence to the memory bank having that memory bank number Bka# within the real bank group which is designated by the succeeding request. If the memory bank is found to be busy, a bank busy bit BB of 1 is supplied to one of the request registers 88 through 91, e.g., 88 over one of the paths 84 through 87, e.g., 84. Details of the bank busy management unit 79 will be described later.

In each cycle, the priority circuit 96 selects one of the four requests in the request registers 88 through 91. At this point, the request is selected with reference to the RA coincidence bit RM, RA change inhibit bit RI and the bank busy bit BB of each of the requests in such a manner that the four memory banks in the corresponding real bank group may be accessed successively with a minimum change of the row address. Details of the priority circuit 96 will be described later.

The request selected by the priority circuit 96 is set in the request register 98. The column address CA, the row address RA, a request selection success signal SS and the memory bank number Bka# within the real bank group, all included in the selected request, are sent to the main storage 6 over paths 99 through 102 which are bundled into a path 29. As will be discussed later, various signals associated with this request are also sent to the RA management unit 78 and bank busy management unit 79.

(4C) Priority Circuit

Figure 11:
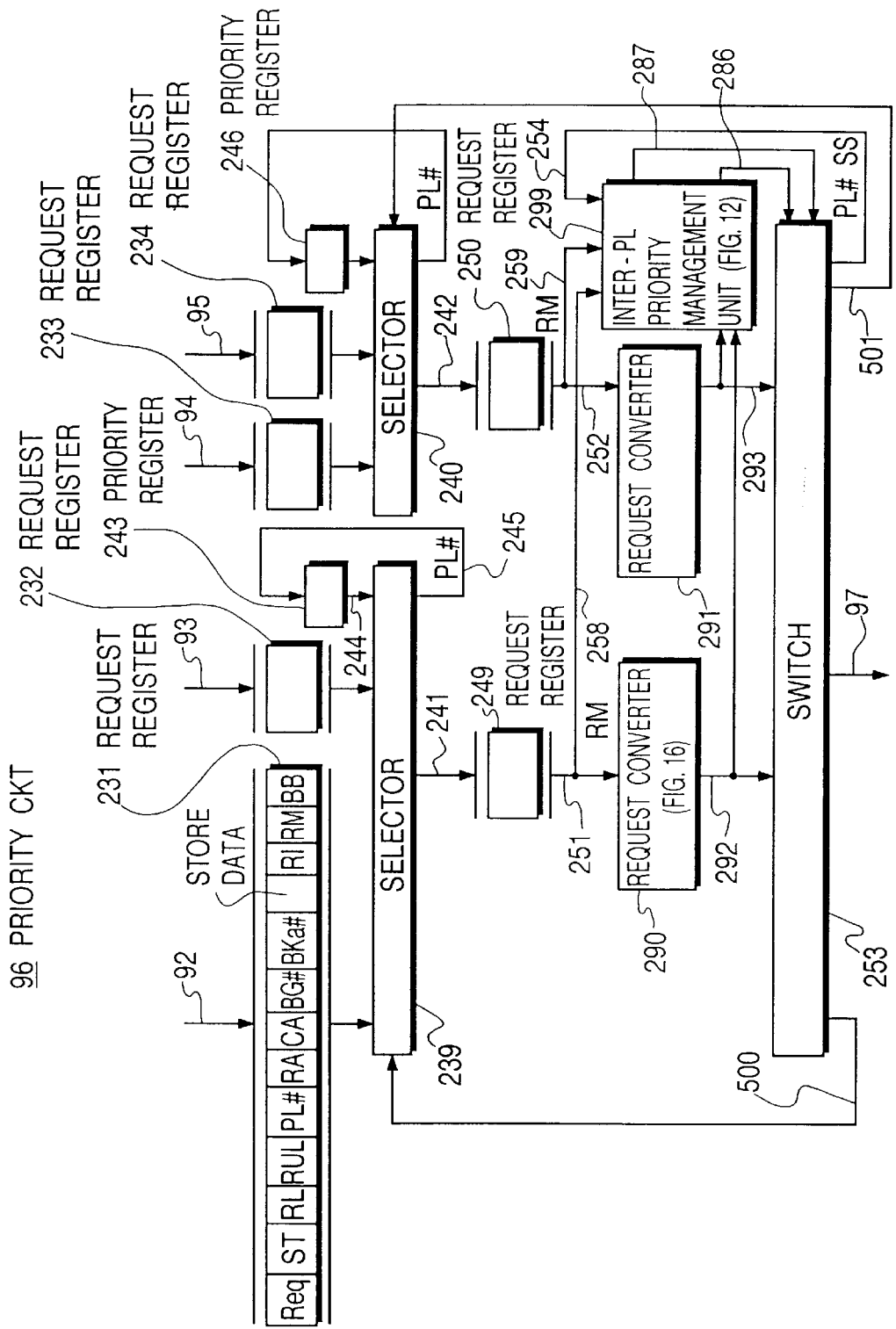
FIG. 11 a circuit diagram of a priority circuit used in the priority control circuit of FIG. 6.

Referring to FIG. 11, in the priority circuit 96, request registers 231 through 234 receive requests from the request registers 88 through 91 via path 92 through 95, respectively. That is, the request register 231 or 232 retains successively a group of requests issued by the requester 17 or 18 in the memory access pipeline 3. Likewise, the request register 233 or 234 holds successively a group of requests issued by the requester 19 or 20 in the memory access pipeline 4. Various items of information constituting a request are illustrated inside the request register 231 in FIG. 11.

If the request registers 231 and 232 both hold valid requests, a selector 239 selects one of the two requests in accordance with a select signal 244 supplied by a priority register 243. If only one of the request registers retains a valid request, the selector 239 selects that valid request without regard to the select signal 244 given by the priority register 243. In like manner, a selector 240 selects one of the requests in the request registers 233 and 234 in accordance with the value of a priority register 246.

The selector 239 supplies the priority register 243, via a path 245, with a register identification number of 0 or 1 indicating which of the request registers 231 and 232 retains the request which has been selected by the selector 239. The priority register 243 inverts the received register identification number and sends the inverted number as the select signal to the selector 239 over a path 244. This basically allows the selector 239 to select the registers 231 and 232 alternately. The other request registers 233 and 234, selector 240 and priority register 246 operate in exactly the same manner.

The requests selected by the selectors 239 and 240 are transferred to request registers 249 and 250 via paths 241 and 242, respectively. As the request registers 231 and 232 hold the requests from the memory access pipeline 3, and the request registers 233 and 234 retain the requests from the memory access pipeline 4, the request register 249 holds a selected one of the requests from the memory access pipeline 3 and the request register 250 retains a selected one of the requests from the memory access pipeline 4.

The requests held in the request registers 249 and 250 are provided over paths 251 and 252 to request update circuits 290 and 291, respectively. The request update circuit 290 sets to 0 a request flag Req of the request in question when that request is valid but the memory bank requested thereby is busy (BB=1). With its request flag Req set to 0, the request is made invalid. As the bank requested by the request in question is busy, the request cannot be executed. So, the request is canceled from a target of selection by this priority circuit 96. The request update circuit 291 operates in the same manner.

A switch 253 is a circuit that selects one of the requests held in the request registers 249 and 250. An inter-PL priority management unit 299 is a circuit that generates a select signal 286 for controlling the switch 253. The inter-PL priority management unit 299 is one of the circuits characteristic of this embodiment. The conditions under which the inter-PL priority management unit 299 controls the switch 253 in terms of signal selection are as follows:

(1) Of the two valid requests, one request which will increase the number of operations in the row address lock mode is selected in preference to the other request that does not increase the number of operations in that mode.

A more specific condition for the condition (1) above is as follows:

(1A) A request for accessing the same row address as that most recently accessed in a given memory bank is selected in preference to a request for accessing a row address different from that most recently accessed row address.

A more specific condition for the condition (1A) is as follows:

(1AA) In case a memory bank having a row address therein having been locked by a memory access request from one memory access pipeline is accessed by a request from the other memory access pipeline for a row address different from the locked row address, the request from the one memory access pipeline is selected in preference to the request from the other memory access pipeline.

A more specific condition the condition for the condition (1AA) is as follows:

(1AAA) In case a memory bank having a row address therein having been locked by memory access requests from one memory access pipeline is accessed by a request from the other memory access pipeline for a row address different from the locked row address, the request from the other memory access pipeline is selected after a predetermined number n (n is an integer of at least 2) of valid requests from one memory access pipeline have been selected.

(2) If memory access requests from the two memory access pipelines are both valid and if the requests do not meet the condition (1) above (or any of the more specific conditions (1A) through (1AAA)), then the memory access requests from the two memory access pipelines are given substantially the same degree of priority when selected.

(3) If a memory access request from one memory access pipeline is valid and the request from the other memory access pipeline invalid, and if the valid request does not meet the condition (1) above (or any of the more specific conditions (1A) through (1AAA)), then that valid request is selected.

(4) An invalid request is not selected. It is possible to modify the present embodiment so that an invalid request may be selected if there is no other valid request which can be selected.

What follows is a detailed description of how the switch 253 and the inter-PL priority management unit 299 operate. The switch 253 selects a valid request from either of the request registers 249 and 250 depending on the select signal from the inter-PL priority management unit 299. The selected request is placed onto a path 97. The switch 253 sends via a path 254 the request selection success signal SS and the memory access pipeline n umber PL# of the selected request to the inter-PL priority management unit 299. The signal SS indicates that the valid request has been successfully selected. In addition, when one of the request registers 249 and 250 is selected, the corresponding selector 239 or 240 is notified thereof via a path 500 or 501 respectively. The request selected by the switch 253 is deleted from the request register 249 or 250. The unselected request remains in the other request register 249 or 250.

Figure 12:
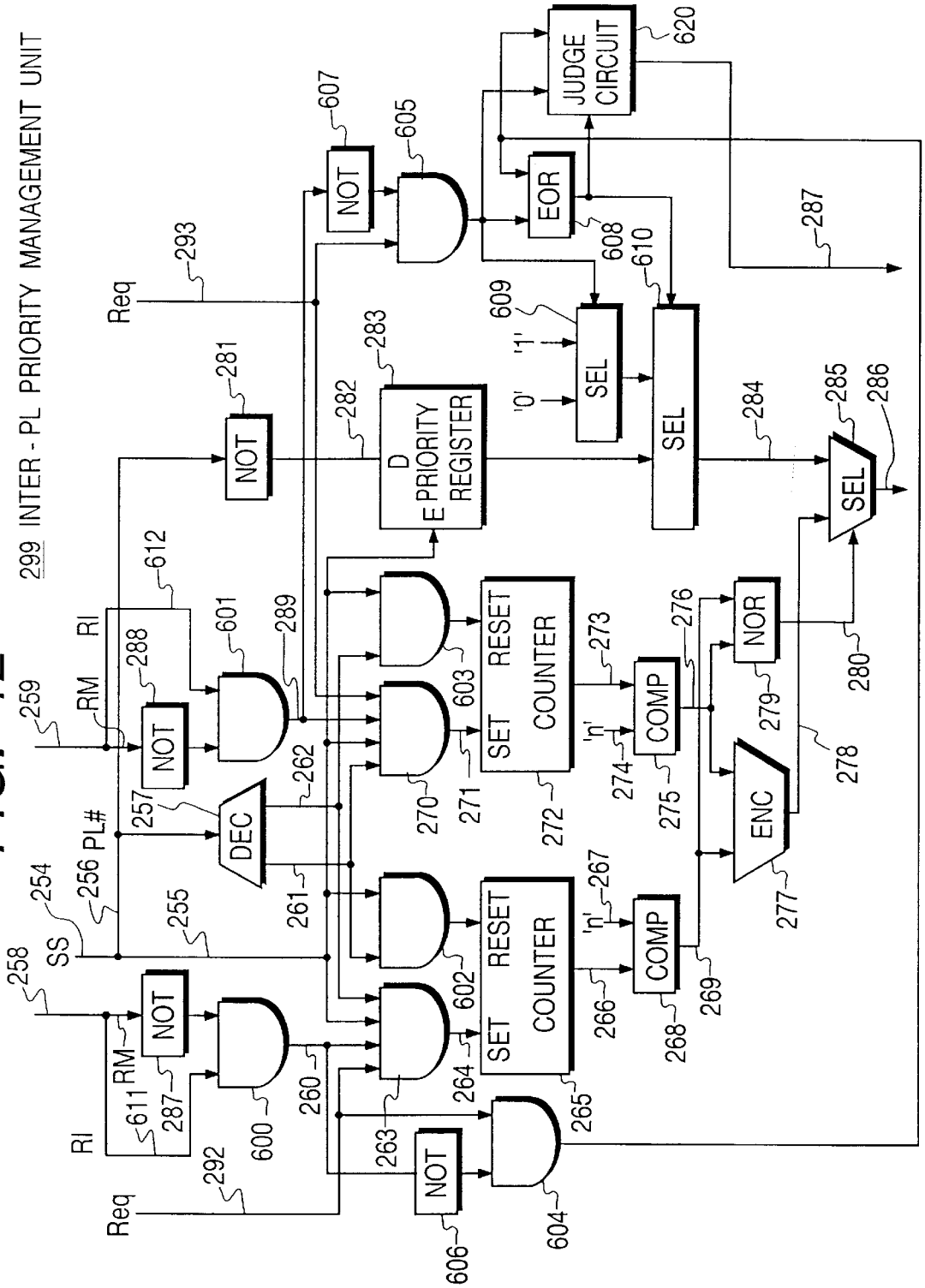
FIG. 12 is a circuit diagram of an inter-PL priority management unit used in the priority circuit of FIG. 11.

The inter-PL priority management unit 299 is fed with requests from the request registers 249 and 250 over paths 258 and 259, respectively. However, none of the request flags Req in these requests is transmitted. Instead, the request flags Req are sent from the request update circuits 290 and 291 over paths 292 and 293. In the inter-PL priority management unit 299, as shown in FIG. 12, a decoder 257 decodes the memory access pipeline number PL# in the selected request fed from the switch 253 (FIG. 11) over the path 254. When the memory access pipeline number PL# is 0, the decoder 257 provides 1 and 0 onto paths 261 and 262 respectively. When the memory access pipeline number PL# is 1, the decoder 257 provides 0 and 1 onto the paths 261 and 262 respectively.

A NOT gate 287 is supplied with the RA coincidence bit RM of a request from the request register 249 over the path 258. The request comes from the memory access pipeline 3. Similarly, a NOT gate 288 is fed with the RA coincidence bit RM of a request from the request register 250 over the path 259. The request comes from the memory access pipeline 4. An AND gate 600 receives two inputs: the output of the NOT gate 287, and an RL update inhibit signal RI sent over the path 258. An AND gate 601 likewise receives two inputs: the output of the NOT gate 288, and an RL update inhibit signal RI supplied over the path 259. The signal RI belongs to the request from the memory access pipeline 3. An AND gate 263 receives four inputs: a request flag Req sent over the path 292 from the request update circuit 290 corresponding to the memory access pipeline 3, a request selection success signal SS given over the path 254 from the switch 253, the output of the AND gate 600, and the output of the decoder 257 over the path 262. The AND gate 270 similarly receives four inputs: a request flag Req sent over the path 293 from the request update circuit 291 corresponding to the memory access pipeline 4, a request selection success signal SS given over the path 254 from the switch 253, the output of the NOT gate 288, and the output of the decoder 257 over the path 261. An AND gate 602 receives two inputs: the request selection success signal SS and the output of the decoder 257 over the path 261. An AND gate 603 likewise receives two inputs: the request selection success signal SS and the output of the decoder 257 over the path 262.

A counter 265 counts the number of times the output of the AND gate 263 is set to 1. The counter 265 is reset when the request selection success signal SS is set to 1 and the output (on path 261) of the decoder 257 is also set to 1. In like manner, a counter 272 counts the number of times the output of the AND gate 270 is set to 1. The counter 272 is reset when the request selection success signal SS is set to 1 and the output (on path 262) of the decoder 257 is also set to 1.

The NOT gate 287 provides 1 to the AND gate 263 if the RA coincidence bit RM of the request held in the request register 249 of FIG. 11 is 0, i.e., if the bit RA of the preceding request does not coincide with that of the succeeding request in the register 249. Likewise, the NOT gate 288 provides 1 to the AND gate 270 if the RA coincidence bit RM of the request held in the request register 250 of FIG. 11 is 0, i.e., if the bit RA of the preceding request does not coincide with that of the succeeding request in the register 250. The decoder 257 decodes the memory access pipeline number PL# of the preceding request selected by the switch 253 in FIG. 11. The decoded result is sent over the paths 261 and 262 to the reset inputs of the AND gates 263 and 270 and of the counters 265 and 272. For example, the bit RM on the path 258 is assumed to be 1, the bit RM on the path 259 to be 0, the bit RI on the path 259 to be 1, the bit RI on the path 258 to be 0, and the number PL# input to the decoder 257 to be 0 when the request flag Req on the path 293 is 1, the request flag Req on the path 292 is 1 and the signal SS on the path 255 is 1.

That the number PL# is 0 indicates that the preceding request selected by the switch 253 has been issued by the memory access pipeline 3. In that case, the output 261 of the decoder 257 becomes 1. The bit RI being 1 on the path 259 indicates that one of the row addresses in the memory bank requested by the request from the memory access pipeline 4 has been locked. The bit RM being 0 on the path 259 shows that the row address of the request from the memory access pipeline 4 does not coincide with the row address locked.

That a memory bank has a locked row address indicates three things, as evident from the definition of the address lock in the preceding description: (1) a series of memory access requests from the memory access pipeline 3 include a plurality of memory access requests for accessing the same row address in the same memory bank; (2) the first of the plurality of memory access requests has already been executed; and (3) the last of the plurality of memory access requests has yet to be executed. That is, with this embodiment, the memory bank in question is operating in the row address lock mode. Thus if the request held in the request register 250 and sent from the access pipeline 4 were given permission to access the memory bank in question, that request would access the memory bank at a row address different from the row address which has been accessed so far.

In other words, the memory bank in the case above would be required to terminate its operation in the row address lock mode and to permit a new access to another row address. Such a request for reducing the number of operations in the row address lock mode is not selected with this embodiment. Instead, the embodiment is arranged to select the requests from the memory access pipeline (pipeline 3 in this example) having the memory bank locked in preference to other requests. According to the invention, a request from the memory access pipeline 4 is selected only after a predetermined number n of requests from the memory access pipeline 3 have been selected. The selecting operation involved in this case will be described later. The AND gate 601 provides 1 when the request from the memory access pipeline 4 is a request that meets the above-described specific conditions and is not to be executed. The same applies to the AND gate 600.

The predetermined number n is preferably selected through evaluation of system performance so that the overall performance of the processor system will be maximized. The larger the number n is, the more numerous the occasions on which the main storage operates in the row address lock mode and the bigger the performance of the processor system is. On the contrary, the larger the number n, the longer the period in which the requests from the other memory access pipeline are not selected, and the system performance may be lowered. In any case, the number n should preferably be smaller than the total number of column addresses (16 in the example of FIG. 2) belonging to one row address.

The counter 272 counts the number of times the request from the memory access pipeline 3 is select continuously. Likewise, the counter 265 counts the number of times the request from the memory access pipeline 4 is selected. Under the current assumption, the AND gate 601 provides 1 onto a path 289. Eventually the AND gate 270 provides 1. This brings the set input of the counter 272 to 1, causing the count on the counter 272 to be counted up by 1. Because the AND gate 602 also provides 1, the counter 265 is reset. In this embodiment, as described, one o f the counters 265 and 272 is reset whenever the other counter is counted up. That is, one of the counters 265 and 272 always retains 0.

A comparator 2 68 compares the value of the counter 265 with the number n. In the case of a match or a mismatch, the comparator 268 provides respectively a value of 1 or 0 to an encoder 277 and a NOR gate 279. A comparator 275 similarly compares the value of the counter 272 with the number n. The NOR gate 279 provides 1 when at least one of the counters 265 and 272 has reached the number n.

The encoder 277 encodes the outputs of the comparators 268 and 275 and sends a coded signal reflecting the outputs to a selector 285. For example, when the comparators 268 and 275 provide 1 and 0 respectively, the encoder 277 provides 0. When the comparators 268 and 275 provide 0 and 1 respectively, the encoder 277 provides 1. The NOR gate 279 sends its output as a select signal to the selector 285. The selector 285 selects the output of the encoder 277 when the NOR gate 279 provides 1, i.e., when one of the comparators 268 and 275 provides 1 (that is, when the count value on one of the counters 265 and 272 has reached the number n). With the counter 265 or 275 having attained the number n, the selector 285 generates a signal for selecting requests yet to be selected.

The selector 285 selects a path 284 when neither of th e counters 265 and 272 has reached the number n. On the path 28 4 is placed a memory access pipeline number as follows:

A NOT gate 281 is supplied with the memory access pipeline number PL# from the switch 253 (FIG. 11) over a path 256. The output of the NOT gate 281 is sent to the input D of a priority register 283. The enable input E of the priority register 283 receives the request selection success signal SS from the switch 253 (FIG. 11) over the path 254, and the data input D of the priority register 283 is fed with the output of the NOT gate 281. That is, the priority register 283 holds the inverted value of the memory access pipeline number PL# only if the request selection success signal SS is 1.

An AND gate 605 receives two inputs: a request flag supplied over the path 293, and the output of the AND gate 601 inverted by a NOT gate 607. Eventually, the AND gate 605 provides 1 when the request from the memory access pipeline 4 is found to be a valid request and when the request does not meet the above-described condition for inhibiting the execution of that request (RI=1, RM=0). A selector 609 selects the access pipeline number 0 when the AND gate 605 provides 0, i.e., when the request from the access pipeline 4 either is invalid (invalid requests include those made invalid by a request inverting circuit 290 or 291; the same holds for the description hereunder), or is valid and meets the above condition for inhibiting request execution. The selector 609 selects the access pipeline number 1 when the AND gate 605 provides 1, i.e., when the request from the access pipeline 4 is valid and does not meet the above condition for inhibiting request execution.

An AND gate 604 and a NOT gate 606 operate in the same manner as the AND gate 605 and the NOT gate 607. Thus, the AND gate 604 provides 0 when the request from the access pipeline 3 either is invalid, or is valid and meets the above condition for inhibiting request execution. The AND gate 605 provides 1 when the request from the access pipeline 3 is valid and does not meet the above condition for inhibiting request execution. An exclusive-OR gate 608 receives the inputs of the AND gates 604 and 605. A selector 610 selects the output of the priority register 283 when the exclusive-OR gate 608 provides 0, and selects the output of the selector 609 when the exclusive-OR gate 608 provides 1.

The selector 285 selects the output of the selector 610 on the path 284 when the NOR gate 279 provides 0, i.e., when neither of the counters 265 and 272 has reached the number n. The AND gates 604 and 605 both provide 1 when the two requests are both valid and do not meet the above condition for inhibiting request execution. In such a case, the exclusive-OR gate 608 provides 0 and the selector 610 selects the output of the priority register 283. The priority register 283 retains the number of the memory access pipeline different from that of the most recently selected memory access pipeline. Thus, every time the switch 253 (FIG. 11) selects a request, the inter-PL priority management unit 299 alternately assigns selection priority to one of the memory access pipelines every cycle, so that the request from the unselected memory access pipeline will always be selected next. This scheme affords equal opportunity of memory access to the two memory access pipelines.

One of the AND gates 604 and 605 provides 0 and the other provides 1, when one of the requests either is invalid or is valid and meets the above condition for inhibiting request execution and when the other request is valid and does not meet the above condition for inhibiting request execution. In that case, the latter request is selected. For example, if the AND gate 605 provides 1 and the AND gate 604 provides 0, it means that the request from the memory access pipeline 3 is either invalid, or valid and at the same time meets the above condition for inhibiting request execution and that the request from the memory access pipeline 4 is valid and does not meet the above condition for inhibiting request execution. In such a case, with the AND gate 605 providing 1, the selector 609 selects the memory access pipeline number 1. This causes the exclusive-OR gate 608 to provide 1. The selector 610 selects the output of 1 from the selector 609. Thus, with the memory access pipeline number 1 selected, the request from the memory access pipeline 4 is selected. When the AND gate 604 provides 1 and the AND gate 605 provides 0, the selector 610 selects the memory access pipeline number 0 in like manner.

The AND gates 604 and 605 both provide 0 when one of the requests either is invalid or is valid and at the same time meets above condition for inhibiting request execution and when the other request is invalid. Although this embodiment is arranged so that the AND gates 604 and 605 would both provide 0 if the two requests were both valid and meet the above condition for inhibiting request execution, that does not happen because the two requests are prevented by appropriate arrangements from simultaneously meeting the above condition for inhibiting request execution. Thus, if the AND gates 604 and 605 both provide 0, none of the requests needs to be selected. In that case, the exclusive-OR gate 608 provides 1. A determining circuit 620 checks to see if the exclusive-OR gate 608 provides 1 and if the AND gates 604 ad 605 both provide 0. If the result of the above check is affirmative, the determining circuit 620 sends a selection unnecessary signal to the switch 253 (FIG. 11) over a path 298.

Returning to FIG. 11, the switch 253 selects one of the requests in the request registers 249 and 250 in accordance with the memory access pipeline number designated by the selection signal from a path 286. The selected request is sent to the request register 98 (FIG. 6) over the path 97. The switch 253 incorporates a circuit (not shown) that adds to the selected request a bank busy time BT defining a predetermined time in which a given memory bank is being monopolized by the selected request.

Each real bank group 33, 34, 35 or 36 has a control circuit (not shown) which controls, every time a new request is sent from the priority circuit 96, the operation of the memory bank requested by the request with reference to the row address lock bit and row address unlock bit included in that request. If the row address lock bit is 1 and if the memory bank in question is not be in the row address lock mode, the control circuit places the memory bank in the row address lock mode and executes the request in question on that memory bank. If the memory bank is already in the row address lock mode, the control circuit keeps operating the memory bank in the same mode and executes the request on that memory bank. If the row address unlock bit in the request is 1, the control circuit executes the request on the memory bank that is kept in the row address lock mode. After execution of the request, the control circuit removes the memory bank from the row address lock mode.

(4D) RA Management Unit

Figure 7:
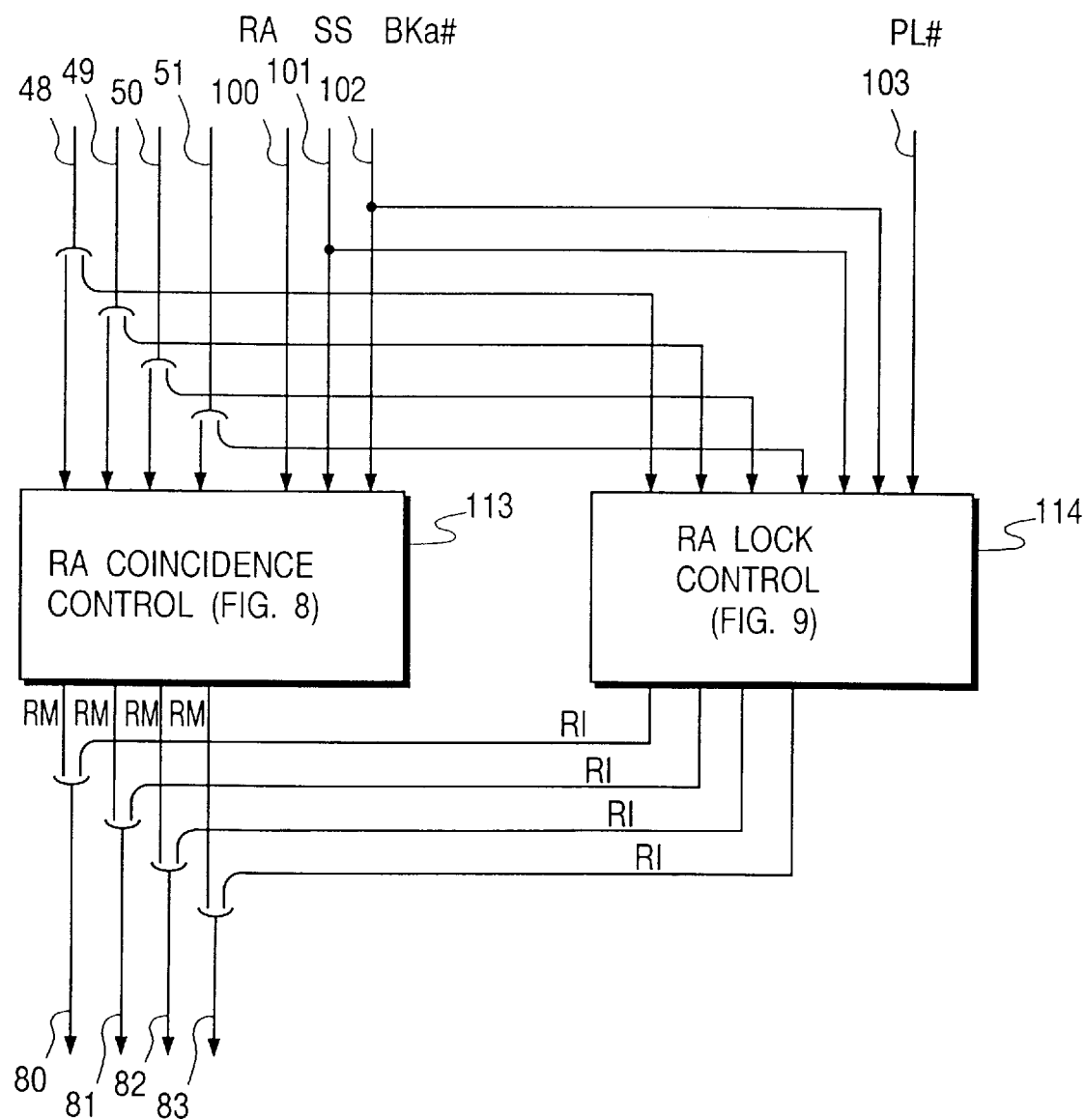
FIG. 7 is a block diagram of an RA management unit used in the priority control circuit of FIG. 6.

Referring to FIG. 7, the RA management unit 78 comprises an RA coincidence control circuit 113 for generating a row address coincidence signal RM and an RA lock control circuit 114 for generating a row address update inhibit signal RI.

Figure 8:
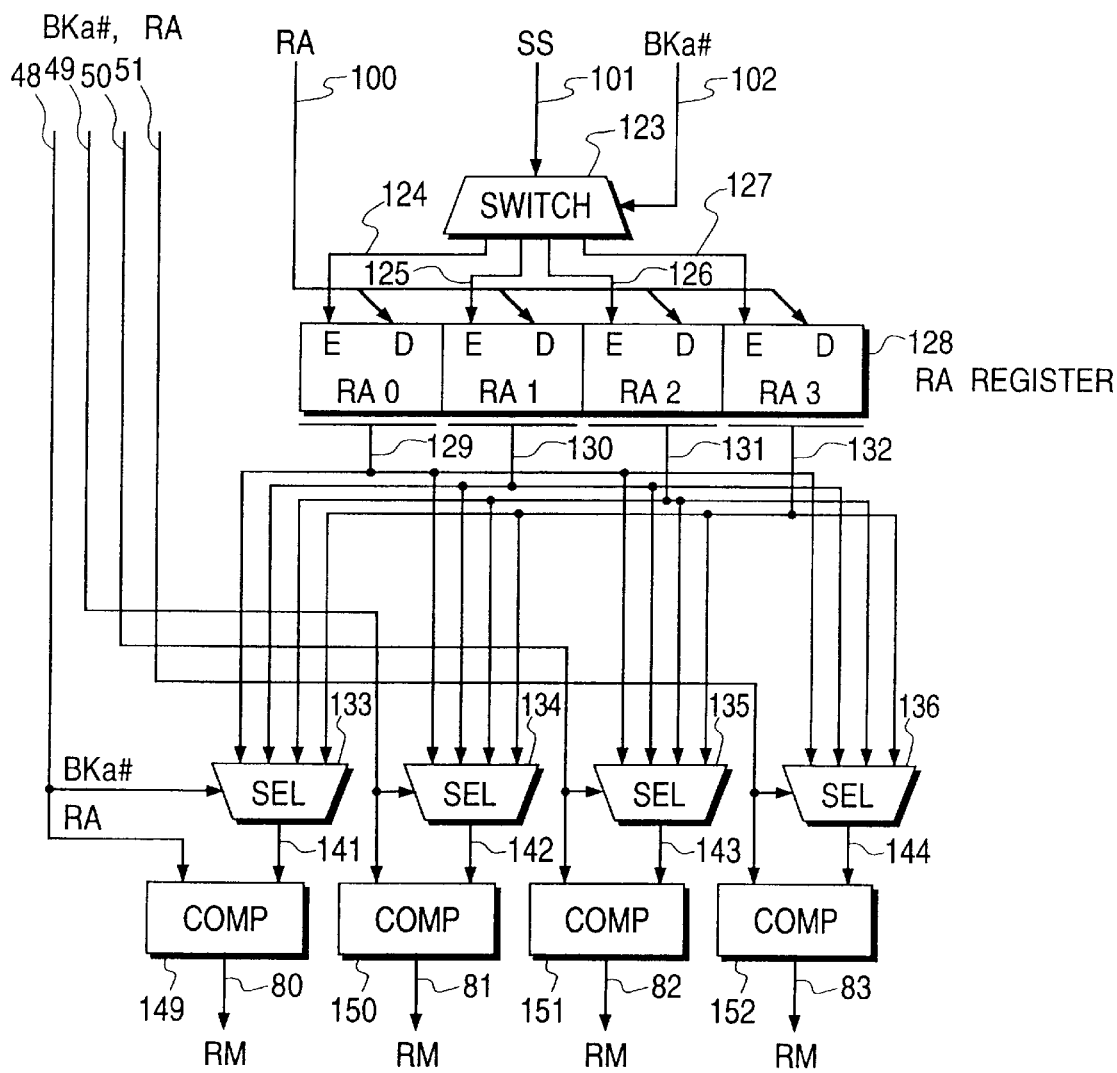
FIG. 8 is a circuit diagram of an RA coincidence control circuit used in the RA management unit of FIG. 7.

In FIG. 8, the RA coincidence control circuit 113 has an RA register 128 that includes four fields RA0 through RA3 for retaining the most recently accessed row addresses in the corresponding four memory banks. The priority circuit 96 in the priority control circuit 44 (FIG. 6) selects a new request and sets that request to the request register 98. The selected request is transferred from the request register 98 over a path 101 to a switch 123. The switch 123 is supplied with the row address RA contained in the selected request, with the request selection success signal SS, and with the bank number Bka# within the corresponding real bank group over paths 100, 101 and 102, respectively. The switch 123 writes the received row address RA to that field in the RA register 128 which corresponds to one memory bank having the bank number Bka# within the applicable real bank group 128.

Selectors 133 through 136 and comparators 149 through 152 are provided corresponding to the four memory banks. Illustratively, the selector 133 responds to the memory bank number Bka# within the real bank group designated by the succeeding request supplied over the path 48, selects the row address at which the memory bank having the number Bka# was most recently accessed, and sends the selected row address to the comparator 149. The comparator 149 compares the row address designated by the succeeding request fed over the path 48 with the row address provided by the selector 133. In case of a match, the comparator 149 supplies the request register 88 (FIG. 6) via the path 80 with a row address coincidence signal RA regarding the succeeding request. The same holds for the other selectors 134 through 136 and for the comparators 150 through 152.

Figure 9:
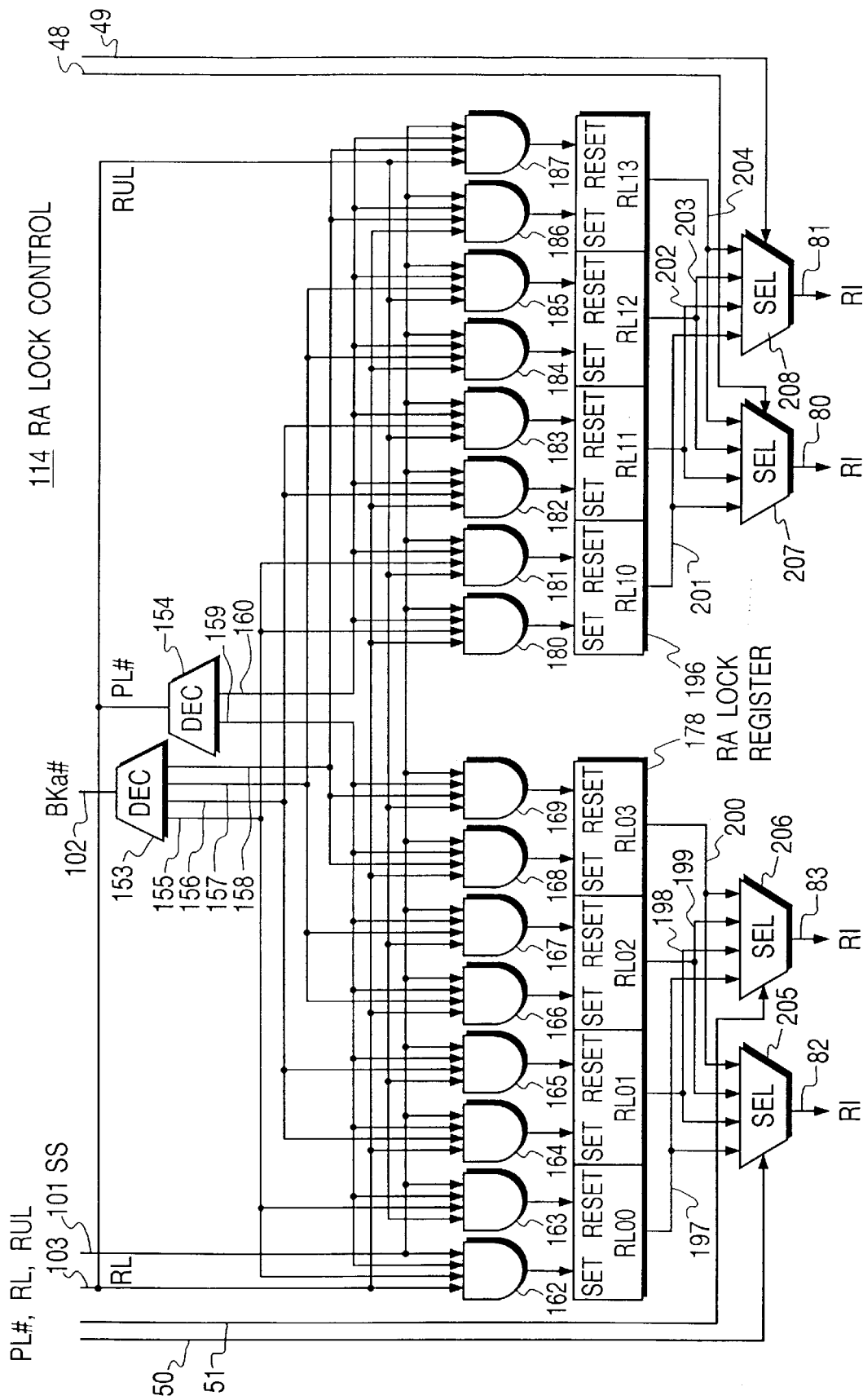
FIG. 9 is a circuit diagram of an RA lock control circuit used in the RA management unit of FIG. 7.

Referring to FIG. 9, the RA lock control circuit 114 includes RA lock registers 178 and 196 corresponding to the memory access pipelines 3 and 4, respectively. The RA lock register 178 has four RA lock bits RL00 through RL03 (a one-bit field each) corresponding to the four memory banks. Of the two digits suffixed to the reference characters of each of the RA lock bits RL00 through RL03, the left-hand digit (0) indicates the memory access pipeline number 0 and the right-hand digit denotes the memory bank number within the corresponding real bank group. Illustratively, a given RA lock bit e.g., RL00) takes a value of 1 or 0 indicating that the request from the corresponding memory access pipeline 0 is currently locking a row address in the memory bank Bka#0. The same holds for the RA lock register 196.

When the priority circuit 96 in the priority control circuit 44 (FIG. 6) selects a new request and sets that request to the request register 98 (FIG. 6), the request register 98 sends the row address lock bit RL included in the selected request over a path 103 to two sets of AND gates: AND gates 162, 164 166 and 168 on the one hand, and AND gates 180, 182, 184 and 186 on the other. The AND gates 162, 164, 166 and 168 are provided corresponding to the respective fields of the RA lock register 178 and connected to the set inputs of these fields. The AND gates 180, 182, 184 and 186 are provided corresponding to the respective fields of the RA lock register 198 and also connected to the set inputs of these fields. The row address unlock bit RUL in the selected request is further sent over the path 103 to another two sets of AND gates: AND gates 163, 165, 167 and 169 on the one hand, and AND gates 181, 183, 185 and 187 on the other. The AND gates 163, 165, 167 and 169 are provided corresponding to the respective fields of the RA lock register 178 and connected to the reset inputs of these fields. The AND gates 181, 183, 185 and 187 are provided corresponding to the respective fields of the RA lock register 198 and also connected to the reset inputs of these fields.

Furthermore, the memory access pipeline number PL# of the selected request is sent over the path 103 to a decoder 154. When the memory access pipeline number PL# is 0, the decoder 154 sends a value of 1 over a path 159 to the AND gates 162 through 169 connected to the RA lock register 178 corresponding to the memory access pipeline 3. Likewise, when the pipeline number PL# is 1, the decoder 154 sends a value of 1 over a path 160 to the AND gates 180 through 187 connected to the RA lock register 196 corresponding to the memory access pipeline 4.

In addition, the bank number Bka# within the corresponding real bank group included in the selected request is sent over the path 102 to a decoder 153. When the number Bka# is 0, 1, 2 and 3, the decoder 153 supplies a value of 1 to four pairs of AND gates 162 and 163, 164 and 165, 166 and 167, and 168 and 169, respectively, as well as to other four pairs of AND gates 180 and 181, 182 and 183, 184 and 185, and 186 and 187, over paths 155, 156, 157 and 158, respectively. The first four pairs of AND gates 162 and 163, 164 and 165, 166 and 167, and 168 and 169 are connected respectively to the RA lock bits RL00, RL01, RL02 and RL03 in the RA lock register 178. The second four pairs of AND gates 180 and 181, 182 and 183, 184 and 185, and 186 and 187 are connected respectively to the RA lock bits RL00, RL01, RL02 and RL03 in the RA lock register 198.

Thus, any of the RA lock bits (e.g., RL00) in the RA lock register 178 is set when the request from the memory access pipeline 3 is selected by the priority circuit 96, when the selected request turns out to be a request for accessing the memory bank whose memory bank number Bka# within the corresponding real bank group is 0, and when the RA lock bit RL of that request is 1. The RA lock bit RL00 is reset when the request from the memory access pipeline 3 is selected by the priority circuit 96, when the selected request turns out to be a request for accessing the memory bank whose memory bank number Bka# within the corresponding real bank group is 0, and when the RA unlock bit RUL of that request is 1.

The arrangement above also applies to the other RA lock bits RL01 through RL03 in the RA lock register 178 as well as to the RA lock bits in the RA lock register 198. A selector 207 or 208 checks to see if the memory bank to be accessed by a request issued by the memory access pipeline 3 and supplied over the path 48 or 49 is being locked by the preceding request issued by the other memory access pipeline 4 and already selected. More specifically, the selector 207 or 208 first reads, from the RA lock register 196 furnished corresponding to the memory access pipeline 4, the lock bit corresponding to the memory bank number Bka# within the applicable real bank group supplied by the path 48 or 49. The lock bit thus read out is provided as an RA change inhibit bit RI to the request register 88 or 89 (FIG. 6) via the path 80 or 81. A selector 205 or 206 checks to see if the memory bank to be accessed by a request issued by the memory access pipeline 4 and supplied over the path 50 or 51 is being locked by the preceding request issued by the other memory access pipeline 3 and already selected. The selectors 205 and 205 operate in the same manner as the selectors 207 and 208.

(4E) Bank Busy Management Unit

Referring again to FIG. 8, the RA coincidence control circuit 113 has the RA register 128 that includes four fields RA0 through RA3 for retaining the most recently accessed row addresses in the corresponding four memory banks, as described. The priority circuit 96 in the priority control circuit 44 (FIG. 6) selects a new request and sets that request to the request register 98. The selected request is transferred from the request register 98 over the path 101 to the switch 123. The switch 123 is supplied with the row address RA contained in the selected request, with the request selection success signal SS, and with the bank number Bka# within the corresponding real bank group over paths 100, 101 and 102, respectively. The switch 123 writes the received row address RA to that field in the RA register 128 which corresponds to one memory bank having the bank number Bka# within the applicable real bank group.

Figure 10:
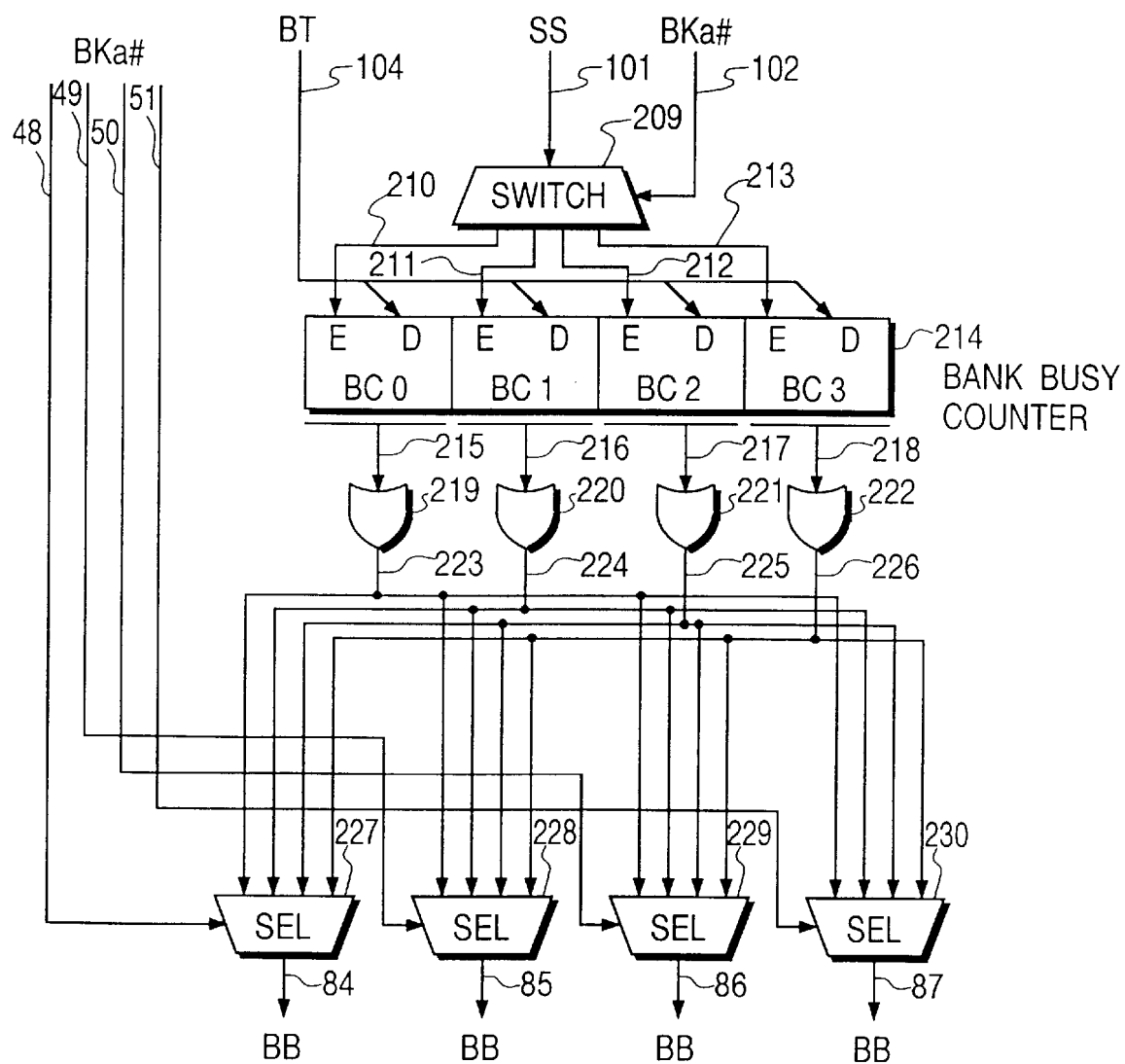
FIG. 10 is a circuit diagram of a bank busy management unit used in the priority control circuit of FIG. 6.

The request selection success signal SS on the path 101 is input to a switch 209 (FIG. 10). The memory bank number (Bka#) within the corresponding real bank group from the path 102 is used as an output destination selection signal of the switch 209. That is, when the memory bank number (Bka#) from the path 102 is 0, the switch 209 transfers the request selection success signal SS to the enable input (E) of a BC3 field in a bank busy counter 214. Likewise, when the memory bank number (Bka#) is 1, 2 and 3, the switch 209 transfers the request selection success signal SS to the enable input (E) of a BC1, a BC2 and a BC3 field, respectively, in the bank busy counter 214. The bank busy time (BT) from the path 104 is connected to all data inputs (D) of the BC0 through BC3 fields in the bank busy counter 214.

In the setup above, the bank busy time (BT) from the path 104 is set to one of the fields BC0 through BC3 in the bank busy counter 214 which is designated by the memory bank number (Bka#) within the corresponding real bank group only if the request selection success signal SS is found to be 1. In addition, the bank busy counter 214 decrements by 1 every cycle each of the bank busy counter fields BC0 through BC3 for each memory bank. If the BC0 through BC3 fields all contain 0, no decrement is carried out. This process allows the applicable bank busy time to be retained for each of the memory banks.

The bank busy times held in the bank busy counter 214 are sent to OR gates (OR0–OR3) 219 through 222 over paths 215 through 218. The OR gates 219 through 222 calculate the logical OR of all bits of the BC0 through BC3 fields in the bank busy counter 214. The results of the OR operation are sent over paths 223 through 226 to selectors (SEL4–SEL7) 227 through 230. A value 0 is provided onto the paths 223 through 226 only if the values of the fields BC0 through BC3 turn out to be 0, as the logical OR of all bits of the fields BC0 through BC3 is provided by the OR gates (OR0–OR3) 219 through 222. If the values of the fields BC0 through BC3 are other than 0, a value 1 is provided onto the paths 223 through 226. Thus, the bank busy signal is sent to the selectors 227 through 230 over the paths 223 through 226.

The selectors 227 through 230 receive only the memory bank numbers (Bka#) within the real bank group included in succeeding requests from the path 48 through 51. The received numbers are each used as a select signal for selecting the bank busy signal corresponding to each memory bank number (Bka#) within the bank group. For example, if the memory bank number (Bka#) received as the select signal by the selector 227 from the path 48 is 0, the selector 227 selects the bank busy signal sent over the path 223 and acquired by the OR gate 219 calculating the logical OR of the field BC0 in the bank busy counter 214. In like manner, when the memory bank number (Bka#) received as the select signal by the selector 227 from the path 48 is 1, 2 and 3, the selector 227 selects respectively the bank busy signals respectively sent over the paths 224, 225 and 226 and acquired by the OR gates 220, 221 and 222 calculating the logical OR of the fields BC1, BC2 and BC3 in the bank busy counter 214.

The same holds for the selectors 228 through 230. That is, when the memory bank number (Bka#) received as the select signal by each of the selectors 228 through 230 from the corresponding path 49, 50 or 51 is 0, 1, 2 and 3, the selector in question selects respectively the bank busy signal sent over the paths 223, 224, 225 and 226 and acquired by the OR gates 219, 220, 221 and 222 calculating the logical OR of the fields BC0, BC1, BC2 and BC3 in the bank busy counter 214. The selected bank busy signal is sent over the paths 84 through 87 to the request registers 88 through 91.

As described, according to the present embodiment, where successively issued requests do not require changing of the row address in a memory bank being accessed, the row address is not changed and only the column address is varied for successive accesses to the memory bank in question by these requests. This allows the processor system to make the most of the row address lock mode characteristic of the synchronous DRAM. Because the RA change inhibit bit RI is used for control purposes, the row address is not changed more than is necessary.

The present invention is not limited to synchronous DRAMs. The invention may also be applied to other memory, e.g., cached DRAMS in which one row address is once designated and plural column addresses are referenced for successive access thereto.

According to the invention, the row address lock mode characteristic of the synchronous DRAM may be used effectively in conjunction with the main storage constituted by synchronous DRAMs and a main storage with a high throughput is obtained.

As many apparently different embodiments of this invention may be made without departing from the spirit and scope thereof, it is to be understood that the invention is not limited to the specific embodiments thereof except as defined in the appended claims.

What is claimed is:

1. A processor system comprising:

a storage device (composed of) having a plurality of memory banks grouped into M real bank groups, M being an integer of at least 2, each of said M real bank groups including N memory banks, N being an integer of at least 2;

a plurality of request circuits each providing a memory access request to said storage device; a plurality of priority control circuits connected to said storage device and to said plurality of request circuits and provided in correspondence to said M real bank groups on a one-to-one basis, each priority control circuit arbitrating a plurality of memory access requests provided thereto in parallel by said plurality of request circuits and for transferring one of said memory access requests to a corresponding one of said plurality of real bank groups; and wherein each memory bank comprises a memory having a plurality of storage locations each accessed by use of a row address and a column address, said memory being constructed so that a group of storage locations thereof having different column addresses and sharing the same row address can be accessed successively by supplying said row address once and by supplying said different column addresses successively, wherein said plurality of memory banks are grouped into N logical bank groups each having M memory banks so that M memory banks belonging, respectively, to different real bank groups and having the same memory bank numbers-within-a-real-bank-group belong to the same logical bank group, wherein a plurality of address blocks each comprising M×L addresses, L being an integer of at least 2, are allocated sequentially to different logical groups, and said M×L addresses belonging to each address block are allocated sequentially in an interleaving manner to M different memory banks belonging to the logical group to which said each address block is allocated, with a result that L addresses are allocated to each of M memory banks belonging to said each logical group, and wherein L addresses belonging to the same address block within a plurality of addresses allocated to each memory bank, are allocated to a plurality of storage locations sharing the same row address and having different column addresses.

2. A processor system according to claim 1, wherein said integer L is smaller than a total number of a group of storage locations in each memory bank sharing the same row address and having different column addresses, and wherein said group of storage locations in each memory bank sharing the same row address and having different column addresses includes a plurality of storage locations to which are allocated addresses belonging to a first one of said address blocks and a plurality of storage locations to which are allocated addresses belonging to at least one other address block within said address blocks.

3. A processor system according to claim 2, wherein said integer L is equal to a fraction $1/n$ multiplication of the total number of said group of storage locations in each memory bank sharing the same row address and having different column addresses in each memory bank, wherein n is an integer of at least 2.

4. A processor system according to claim 1, wherein each of said plurality of priority control circuits includes:

a selection circuit for selecting at least one memory access request which should be granted permission for memory access, among a plurality of memory access requests provided in parallel by said plurality of request circuits;

a plurality of row address storage devices corresponding on a one-to-one basis to said plurality of memory banks included in one of said plurality of real bank groups corresponding to said each priority control circuit, each of said row address storage devices storing a row address of a storage location in a corresponding one of the memory banks, said storage location being one accessed by a preceding memory access request most recently allowed by said selection circuit to access said corresponding memory bank;

a detection circuit for detecting coincidence between first and second row addresses, said first row address being one allocated to one of a plurality of storage locations in one of said plurality of memory banks, said storage location being one accessed by each of said plurality of memory access requests provided in parallel by said plurality of request circuits, said second row address being a row address stored in one of said plurality of row address storage devices corresponding to said one memory bank; and a selection control circuit for controlling said selection circuit depending on results of detection of coincidence by said detection circuit each for one of said plurality of memory access requests.

5. A processor system according to claim 4, wherein said selection control circuit includes a control circuit for controlling said selection circuit so that one of said plurality of memory access requests for which coincidence has been detected by said detection circuit is selected in preference to another of said plurality of memory access requests for which coincidence has not been detected by said detection circuit.

6. A processor system comprising:

a storage device having N×M memory banks, N and M each being an integer of at least 2;

a plurality of request circuits each providing a memory access request to said storage device; and wherein each memory bank comprises a memory having a plurality of storage locations each accessed by use of a row address and a column address, said memory being constructed so that a group of storage locations thereof having different column addresses and sharing the same row address can be accessed successively by supplying said row address once and by supplying said different column addresses successively, wherein said plurality of memory banks are grouped into N logical bank groups each including M memory banks, wherein a plurality of address blocks each comprising M×L addresses, L being an integer of at least 2, are allocated sequentially to different logical groups, and said M×L addresses belonging to each address block are allocated sequentially in an interleaving manner to M different memory banks belonging to the logical group to which said each address block is allocated, with a result that L addresses are allocated to each of M memory banks belonging to said each logical group, wherein said integer L is smaller than a total number of a group of storage locations in each memory bank sharing the same row address and having different column addresses, and wherein said group of storage locations in each memory bank sharing the same row address and having different column addresses includes a plurality of storage locations to which are allocated addresses belonging to a first one of said address blocks and a plurality of storage locations to which are allocated addresses belonging to at least one other address block from that of said address blocks.

7. A processor system according to claim 6, wherein said integer L is equal to a fraction 1/n multiplication of the total number of said group of storage locations in each memory bank sharing the same row address and having different column addresses, where n is an integer of at least 2.

8. A processor system according to claim 6, further comprising:

a priority control circuit connected to said storage device and to said plurality of request circuits, for arbitrating a plurality of memory access requests provided in parallel by said plurality of request circuits and for transferring the arbitrated memory access requests to said plurality of memory banks thereafter, wherein said priority control circuit includes:
a selection circuit for selecting at least one memory access request which should be granted permission for memory access, among a plurality of memory access requests provided in parallel by said plurality of request circuits;
a plurality of row address storage devices corresponding to said plurality of memory banks included in said storage device on a one-to-one basis, each of said row address storage devices storing a row address of a storage location in a corresponding one of the memory banks, said storage location being one accessed by a preceding memory access request most recently allowed by said selection circuit to access said corresponding memory bank;
a detection circuit for detecting coincidence between first and second row addresses, said first row address being one allocated to one of a plurality of storage locations in one of said plurality of memory banks, said storage location being one accessed by each of said plurality of memory access requests provided in parallel by said plurality of request circuits, said second row address being a row address stored in one of said plurality of row address storage devices corresponding to said one memory bank; and
a selection control circuit for controlling said selection circuit depending on results of detection of coincidence by said detection circuit each for one of said plurality of memory access requests.

9. A processor system according to claim 8, wherein said selection control circuit includes a control circuit for controlling said selection circuit so that one of said plurality of memory access requests for which coincidence has been detected by said detection circuit is selected in preference to another of said plurality of memory access requests for which coincidence has not been detected by said detection circuit.

10. A processor system comprising:
a storage device having a plurality of memory banks;
a plurality of request circuits each providing a group of memory access requests to said storage device;

a priority control circuit connected to said storage device and to said plurality of request circuits, for arbitrating a plurality of memory access requests provided in parallel by said plurality of request circuits and for transferring the arbitrated memory access requests to said plurality of memory banks thereafter; and wherein each memory bank comprises a memory having a plurality of storage locations each accessed by use of a row address and a column address, said memory being constructed so that a group of storage locations thereof having different column addresses and sharing the same row address can be accessed successively by supplying said row address once and by supplying said different column addresses successively, wherein said plurality of request circuits each include:
a circuit for sequentially providing a series of memory access requests; and
a lock/unlock request circuit for providing a lock request requesting locking of one row address in one of said plurality of memory banks and or unlock request requesting unlocking of said one row address in said one memory bank after locking of said one row address, and wherein said priority control circuit includes:
a selection circuit for selecting at least one memory access request which should be granted permission for memory access, among a plurality of memory access requests provided in parallel by said plurality of request circuits;
a lock information storage device responsive to a lock request provided by said lock/unlock request circuit included in one of said plurality of request circuits, for storing information indicating that a row address designated by said lock request in a memory bank designated by said lock request is locked by said one request circuit, and responsive to an unlock request provided thereafter by said one lock/unlock request circuit for storing information indicating that the row address in the memory bank is unlocked;
a detection circuit for checking, on the basis of information stored in said lock information storage device, whether each of said plurality of memory access requests provided in parallel by said plurality of request circuits satisfies a first condition, and for checking, when one of said plurality of memory access requests satisfies said first condition, whether said one memory access request satisfies a second condition;
the first condition being that a memory bank accessed by a memory access request coincides with a memory bank having a row address locked by a request circuit other than one request circuit having provided said memory access request;
the second condition being that a row address designated by said one memory access request coincides with the row address locked by the other request circuit; and
a selection control circuit for controlling said selection circuit depending on results of detection of coincidence by said detection circuit each for one of said plurality of memory access requests.

11. A processor system according to claim 10, wherein said selection control circuit includes a control circuit for controlling said selection circuit so that one of said plurality of memory access requests provided by one of said plurality of request circuits and detected by said detection circuit as one not satisfying at least one of said first and said second conditions is selected in preference to another of said plurality of memory access requests provided by another of said plurality of request circuits and detected by said detection circuit as one satisfying said first condition but not satisfying said second condition.

12. A processor system according to claim 11, wherein said control circuit includes a circuit for controlling said selection circuit so that said selection circuit repeats an operation wherein one of said plurality of memory access requests provided by one of said plurality of request circuits and detected by said detection circuit as one not satisfying at least one of said first and said second conditions is selected in preference to another of said plurality of memory access requests provided by another of said plurality of request circuits and detected by said detection circuit as one satisfying said first condition but not satisfying said second condition, until a predetermined number of memory access requests provided by said another request circuit and detected by said detection circuit as ones not satisfying at least one of said first and second conditions are selected, and so that said selection circuit selects said one memory access request.

13. A processor system according to claim 12, wherein said circuit provided in each request circuit for providing a series of memory access requests includes a circuit for sequentially providing a series of memory access requests for accessing a series of storage locations having a series of addresses in response to access information designated by an instruction requesting access to said series of addresses, and wherein said lock/unlock request circuit provided in each request circuit includes a decision circuit for determining, on the basis of said access information designated by said instruction, whether or not a lock request and an unlock request is to be attached to each of said series of memory access requests, so that a lock request is attached to at least a starting one of a plurality of memory access requests which access the same memory bank among said series of memory access requests, and so that an unlock request is attached to at least a last one of said plurality of memory access requests access the same memory bank.

14. A processor system according to claim 13, wherein said series of addresses are equally spaced.

15. A processor system according to claim 10, wherein said lock/unlock request circuit in each request circuit has a circuit for providing a lock request attached to a preceding memory access request provided by said each request circuit and for providing an unlock request attached to another succeeding memory access request provided by said each request circuit, said lock request requesting locking of a row address designated by said preceding memory access request in one of said plurality of memory banks designated by said preceding memory access request, said unlock request requesting unlocking of a row address designated by said succeeding memory access request in one of said plurality of memory banks designated by said succeeding memory access request.

* * * * *